US012413924B2

(12) United States Patent
Franco

(10) Patent No.: US 12,413,924 B2
(45) Date of Patent: Sep. 9, 2025

(54) MOTION DETECTION OF SPEAKER UNITS

(71) Applicant: HARMAN INTERNATIONAL INDUSTRIES, INCORPORATED, Stamford, CT (US)

(72) Inventor: Alfredo Fernandez Franco, Sherman Oaks, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 17/859,444

(22) Filed: Jul. 7, 2022

(65) Prior Publication Data

US 2024/0015459 A1 Jan. 11, 2024

(51) Int. Cl.
*H04S 7/00* (2006.01)

(52) U.S. Cl.
CPC .................................... *H04S 7/30* (2013.01)

(58) Field of Classification Search
None
See application file for complete search history.

(56) References Cited

U.S. PATENT DOCUMENTS 9,398,392 B2 7/2016 Ridihalgh
10,728,683 B2 7/2020 Shi
10,945,090 B1 3/2021 Choisel et al.
2012/0027226 A1 2/2012 Desenberg
2013/0329921 A1 12/2013 Salsman
2015/0023533 A1 1/2015 Johnson et al.
2016/0077549 A1* 3/2016 Wang .................... G06F 1/1632 710/304
2016/0286330 A1 9/2016 Kofman et al.
2017/0055098 A1* 2/2017 Lim ......................... H04R 3/04
2017/0105069 A1* 4/2017 Mezzomo .............. H04R 1/026
2017/0171702 A1* 6/2017 Hansson ................. H04W 4/02
2017/0280265 A1 9/2017 Po
2018/0122396 A1* 5/2018 Lee .......................... H04R 5/04
2018/0367939 A1* 12/2018 Fischer ................... H04S 7/305
2020/0059724 A1 2/2020 Walther et al.
2020/0252738 A1* 8/2020 Welti ....................... H04R 1/02
2021/0168552 A1* 6/2021 Walther ................. H04R 27/00
2021/0337340 A1* 10/2021 Wey ........................ H04S 7/303
2022/0312136 A1* 9/2022 Yamaji .................... H04S 7/302

* cited by examiner

*Primary Examiner* — Duc Nguyen
*Assistant Examiner* — Assad Mohammed
(74) *Attorney, Agent, or Firm* — Artegis Law Group, LLP

(57) ABSTRACT

In various embodiments, a computer-implemented method comprises detecting that a speaker unit has moved to a first location, determining, based on positioning information associated with the speaker unit, a position and an orientation of the speaker unit relative to a target listening area, filtering, using a filter determined based on the position and the orientation, an input audio signal to generate a filtered audio signal, and outputting the filtered audio signal using one or more loudspeakers.

19 Claims, 8 Drawing Sheets

MOTION DETECTION OF SPEAKER UNITS

BACKGROUND

Field of the Various Embodiments

The various embodiments relate generally to audio output devices and, more specifically, to motion detection of speaker units.

Description of the Related Art

It is often desirable to output audio through a sound system, such as groups of speakers. The audio output devices are often positioned at certain locations within a physical space. For example, a given room includes a soundbar centered near a video playback device, such as a television or a computer, with additional satellite speakers positioned proximate to the soundbar. In another example, a room can include speakers that are organized as a home theater, where a center speaker is positioned near the center of a front wall of the room, and front left, front right, rear left, and rear right speakers are each positioned in a corresponding corner of the room. The video playback device transmits a signal to each speaker so that a listener within the physical space hears the combined output of all of the speakers.

During operation of the conventional sound system, the speakers positioned in the listening environment generate a sound field. The sound field of the conventional sound system is highly dependent on the positioning and orientation of the speakers. A typical sound field includes one or more "sweet spots." A sweet spot generally corresponds to a target location for a listener to be positioned in the listening environment. In the sound field, the sweet spots are generally tuned to yield desirable sound quality. Therefore, a listener positioned within in a sweet spot hears the best sound quality that the sound system in the listening environment can offer. As such, the one or more sweet spots are often highly dependent on the positioning and orientation of the speakers For example, FIG. 1 is a schematic diagram illustrating a prior art modular speaker system 100. As shown, the modular speaker system 100 includes a hub speaker unit 102, and speaker units 104. The hub speaker unit 102 includes loudspeakers 112. The speaker units 104 include loudspeakers 114 and subwoofer 116. For explanatory purposes, multiple instances of like objects are denoted with reference numbers identifying the object and additional numbers in parentheses identifying the instance where needed.

The modular speaker system 100 operates in multiple arrangements. For example, the modular speaker system 100 can operate in a first arrangement 110 as a soundbar with multiple speaker units 104 (e.g., 104(1) and 104(2)) attached and/or proximate to the hub speaker unit 102. A movement 120 of the speaker units 104 causes the modular speaker system 100 to operate in a second arrangement 130, where the speaker units 104 are in distinct locations within a listening environment.

In various embodiments, the loudspeakers 112 (e.g., 112 (1), 112(2), 112(3)) of the hub speaker unit 102 and the loudspeakers 114 (e.g., 114(1), 114(2), 114(3), etc.) of the respective speaker units 102, 104 reproduce an audio signal by generating soundwaves that generate a sound field. The hub speaker unit 102 and/or the speaker units speaker unit 104 drive the respective loudspeakers 112, 114 to generate soundwaves in specific directions to generate a sound field in a specific location. For example, the loudspeakers 112 included in the hub speaker unit 102 generate separate soundwaves 132 (e.g., 132(1), 132(2), 132(3)) that combine to generate the sweet spot 136 around a target listening area 140.

Notably, when the speaker units 104 are positioned at locations remote to the hub speaker unit 102, the speaker units 104 may not generate soundwaves that combine to generate the sound field to create a sweet spot 136 at the target listening area 140. For example, the speaker units 104(1), 104(2) could drive the respective sets of loudspeakers 114 to generate soundwaves 134(1), 134(2) in a direction where the respective soundwaves 134(1), 134(2) combine with the soundwaves 132 produced by the hub speaker unit 102 to generate a sweet spot 136 that does not encompass the target listening area 140. As a result, listeners positioned within the target listening area 140 do not hear the optimized version of the sound wave and therefore have a degraded listening experience. Accordingly, the positioning of speaker units 104 of the modular speaker system 100 results in sub-optimal generation of a sound field in an area of the listening environment.

Further, another drawback with conventional sound systems is that setting up a conventional sound system in a listening environment is a slow and delicate process. During set-up, speakers are manually placed in the listening environment, where the placement of the speakers affects the location of the sweet spot. As a result, a listener is required to execute iterative, manual adjustments to one or more speakers to determine whether a specific position and orientation sounds better than an alternative. Alternatively, the listener conducts various testing, uses various tuning equipment, and/or perform various calculations to determine possible desirable positioning and orientations of the speakers. Once those possible desirable positioning and orientations are determined, the listener manually adjusts the positioning and orientation of each speaker accordingly. Determining, positioning, and orienting can be a slow process.

In addition, a listener is required to perform such processes each time a speaker changes position. Due to the difficult calibration process, the listener is discouraged from moving any of the calibrated speakers, including portable speakers that are otherwise configured operate in a wide range of positions within the listening environment.

As the foregoing illustrates, what is needed are more effective techniques for providing audio from multiple speakers that have changed position.

SUMMARY

In various embodiments, a computer-implemented method comprises detecting that a speaker unit has moved to a first location, determining, based on positioning information associated with the speaker unit, a position and an orientation of the speaker unit relative to a target listening area, filtering, using a filter determined based on the position and the orientation, an input audio signal to generate a filtered audio signal, and outputting the filtered audio signal using one or more loudspeakers.

Further embodiments provide, among other things, non-transitory computer-readable storage media storing instructions for implementing the method set forth above, as well as a system configured to implement the method set forth above.

At least one technical advantage of the disclosed techniques relative to the prior art is that, with the disclosed techniques, the modular speaker system calibrates the speaker units in the system to generate an optimized sound field without a user having to perform iterative positioning and calibrating processes. In particular, the disclosed techniques automatically calibrate the modular speaker system whenever a speaker unit is moved. Further, the disclosed techniques reduce the number of times that the positions of the speaker units are determined, which provide an optimized sound field while using less processing resources and consuming less power than conventional calibration approaches. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
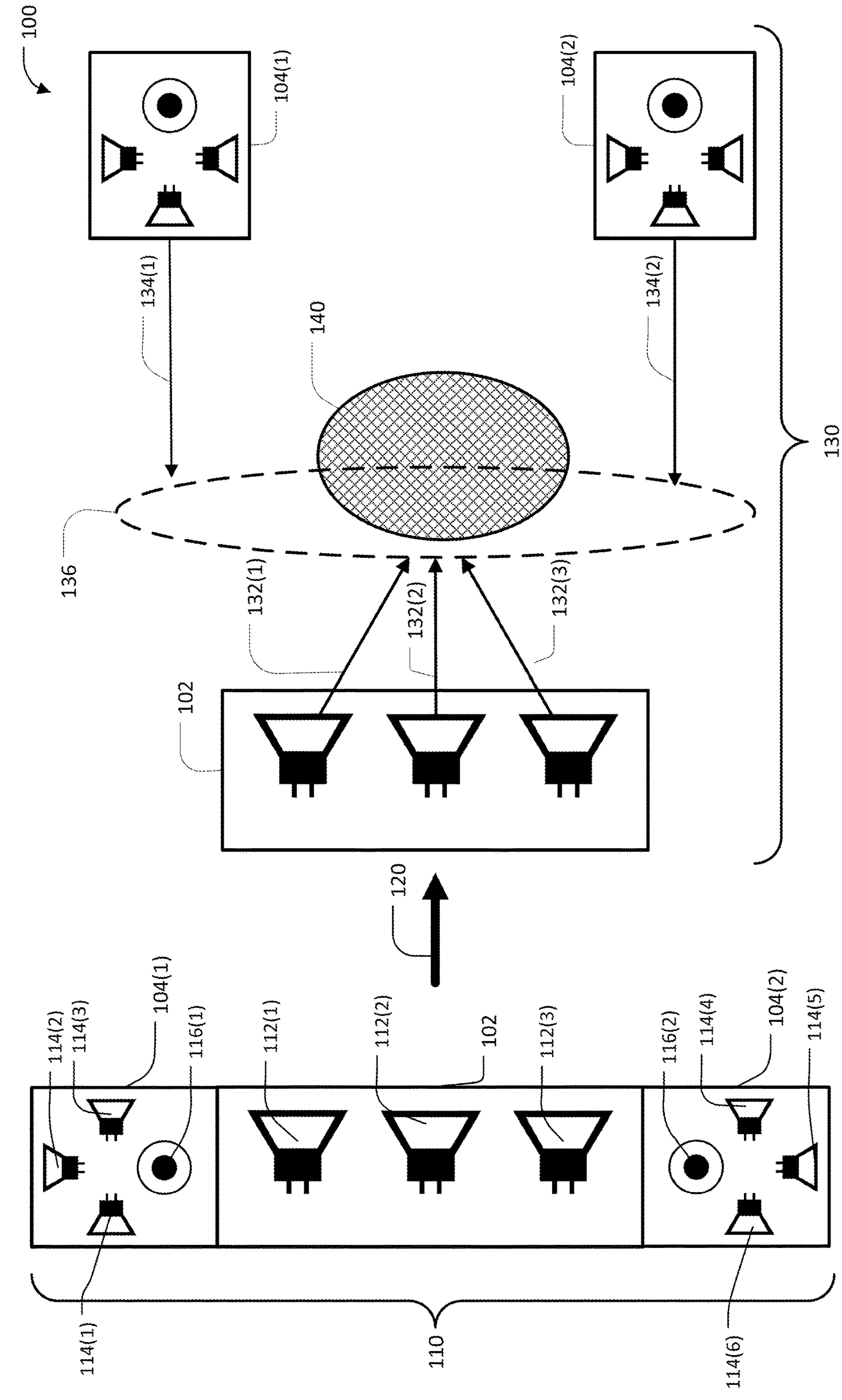
FIG. 1 (PRIOR ART)
FIG. 1 is a schematic diagram illustrating a prior art modular speaker system.
Figure 2:
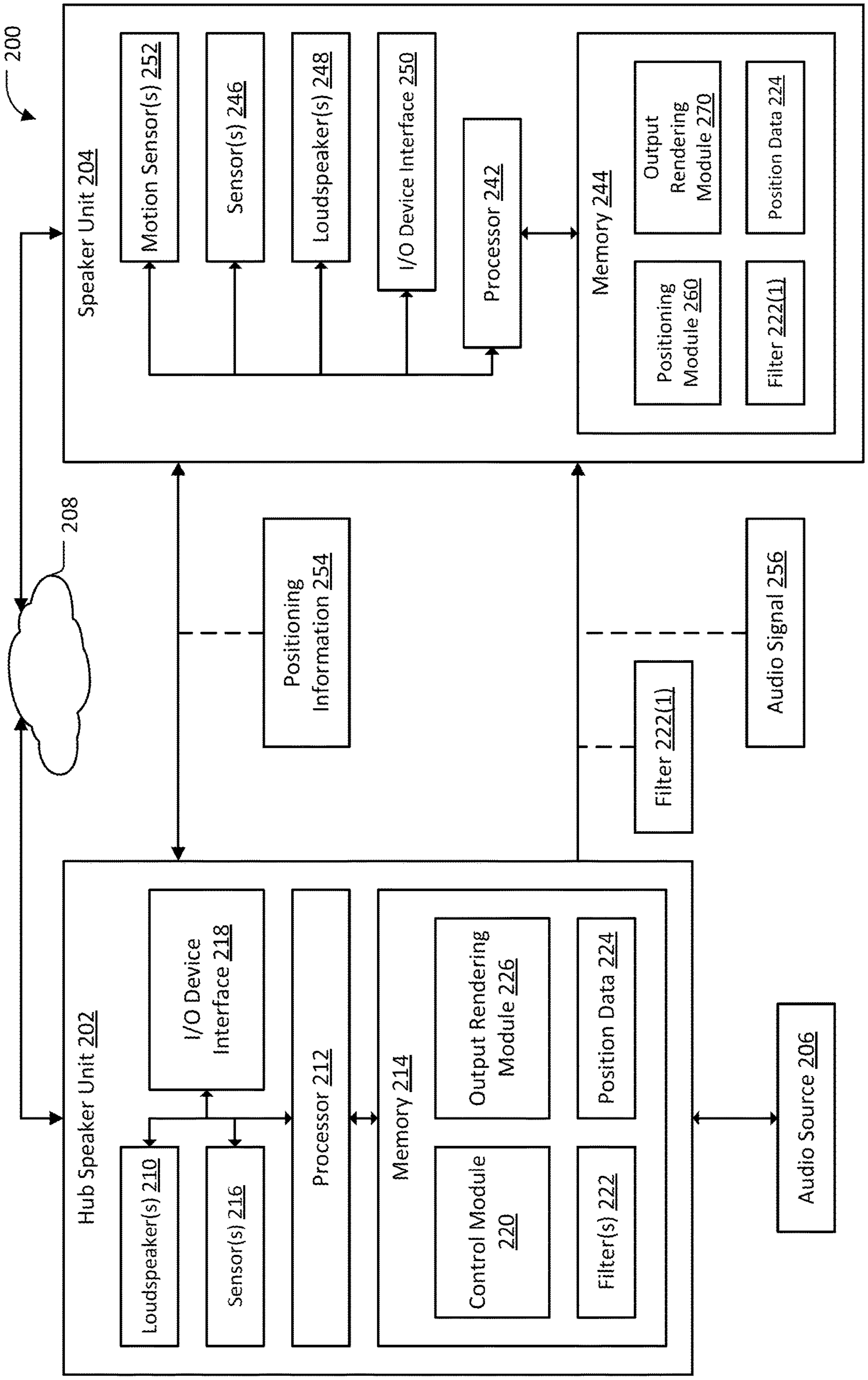
FIG. 2 is a conceptual block diagram of a modular speaker system configured to implement one or more aspects of the present disclosure.

FIG. 2 is a conceptual block diagram of a modular speaker system 200 configured to implement one or more aspects of the present disclosure. As shown, and without limitation, the modular speaker system 200 includes a hub speaker unit 202, a speaker unit 204 (e.g., 204(1)), a network 208, and an audio source 206. The hub speaker unit 202 includes, without limitation, loudspeakers 210, one or more sensors 216, input/output (I/O) device interface 218, a processor 212, and a memory 214. The memory 214 includes, without limitation, a control module 220, a filter 222, and position data 224. The speaker unit 204 includes, without limitation, a processor 242, a memory 244, loudspeakers 248, one or more sensors 246, I/O device interface 250, and one or more motion sensors 252. The memory 214 includes, without limitation, a positioning module 260, a filter 222(1), position data 224(1), and output rendering module 270. The modular speaker system 100 can include multiple instances of elements, even when not shown, and still be within the scope of the disclosed embodiments.

In operation, the hub speaker unit 202 and/or speaker unit 204 tracks the movement of the speaker unit 204 based on positioning information 254 generated from sensor data acquired by one or more of the sensors 216, 246, and/or the motion sensors 252. Based on the positioning information 254, the control module 220 and/or the positioning module 260 determine the current position of the speaker unit 204. The control module 220 and/or the positioning module 260 generates a filter 222(1) for the speaker unit 204. The output rendering module 270 uses the filter 222(1) to process the audio signal 256 to generate a filtered audio signal. The output rendering module 270 renders the filtered audio signal by driving the loudspeakers 248 to generate a soundwave specified in the filtered audio signal. In various embodiments, the output rendering module 226 uses one or more filters 222 to generate a separate set of filtered audio signals. The output rendering module 226 drives the loudspeakers 210 with the set of filtered audio signals to generate one or more soundwaves in the respective filtered audio signals. The soundwaves generated by the hub speaker unit 202 and speaker unit 204 combine to generate a sound field that creates a sweet spot that encompasses a target listening area.

The hub speaker unit 202 is a device that drives loudspeakers 210 to generate, in part, a sound field. In various embodiments, the hub speaker unit 202 includes a control module 220 that determines the positions of each speaker unit 204 included in the modular speaker system 200 and stores the positions as position data 224. In some embodiments, the control module 220 uses the position data 224 to generate a set of filters 222, where the hub speaker unit 202 and each speaker unit 204 use the filters to generate directional soundwaves to generate a sound field at a specific location within the listening environment. In some embodiments, the hub speaker unit 202 can transmit the position data 224 and/or the motion sensors 252 via the network 208 to one or more cloud-based computing resources, such as an online optimization service, to determine the positions of the speaker unit 204 and/or the filters 222.

In various embodiments, the hub speaker unit 202 can be a central unit in a home theater system, a soundbar, and/or another device that communicates with the one or more speaker units 204. The hub speaker unit 202 is included in one or more devices, such as consumer products (e.g., portable speakers, gaming, gambling, etc. products), smart home devices (e.g., smart lighting systems, security systems, digital assistants, etc.), communications systems (e.g., conference call systems, video conferencing systems, speaker amplification systems, etc.), and so forth. In various embodiments, the hub speaker unit 202 is located in various environments including, without limitation, indoor environments (e.g., living room, conference room, conference hall, home office, etc.), and/or outdoor environments, (e.g., patio, rooftop, garden, etc.).

Additionally or alternatively, in some embodiments, the hub speaker unit 202 includes a reference position. For example, a specific point of the hub speaker unit 202 can act as an anchoring reference position from which other positions within the environment are determined. In such instances, the position data 224 includes the position of the speaker unit 204 as a specific distance and angle (e.g., $\{d, \theta\}$) and an orientation (e.g., $\{\mu, \varphi, \psi\}$) relative to the reference position. Similarly, the position data 224 includes the target listening area as a specific distance and angle from the reference point. In some embodiments, the control module 220 and/or the positioning module 260 estimate the target listening area as a specific distance directly in front of the reference point. For example, when the reference point is the location a center loudspeaker included in the hub speaker unit 202 (e.g., loudspeakers 210), the control module 220 and/or the positioning module 260 can estimate the target listening area as area located at a specific distance (e.g., 3 m) in front of the reference point.

The processor 212 can be any suitable processor, such as a central processing unit (CPU), a graphics processing unit (GPU), an application-specific integrated circuit (ASIC), a field programmable gate array (FPGA), a digital signal processor (DSP), and/or any other type of processing unit, or a combination of different processing units, such as a CPU configured to operate in conjunction with a GPU. In general, the processor 212 can be any technically-feasible hardware unit capable of processing data and/or executing software applications.

Memory 214 can include a random-access memory (RAM) module, a flash memory unit, or any other type of memory unit or combination thereof. The processor 212 is configured to read data from and write data to memory 214. In various embodiments, the memory 214 includes non-volatile memory, such as optical drives, magnetic drives, flash drives, or other storage. In some embodiments, separate data stores, such as an external included in the network 208 ("cloud storage") can supplement the memory 214. The control module 220 and/or the output rendering module 226 within memory 214 can be executed by the processor 212 to implement the overall functionality of the hub speaker unit 202 and, thus, to coordinate the operation of the modular speaker system 200 as a whole. In various embodiments, an interconnect bus (not shown) connects the processor 212, the memory 214, the loudspeakers 210, the I/O device interface 218, the sensors 216, and any other components of the hub speaker unit 202.

The control module 220 executes various techniques to determine positions of the speaker units 204 included in the listening environment and generates one or more filters 222 to generate the sound field to encompass the target listening area. In various embodiments, the control module 220 receives positioning information 254 from the speaker unit 204 and/or generate positioning information 254 and processes the positioning information 254 in order to generate the position data 224. For example, the control module 220 can periodically receive the positioning information 254 from the speaker unit 204 while the speaker unit 204 is in motion. In another example, the control module 220 can acquire the positioning information 254 internally from the sensors 216 (e.g., received optical data and/or auditory data received in response to test signals generated by the hub speaker unit 202).

In various embodiments, the control module 220 aggregates the positioning information 254 to track the movement of the speaker unit 204 within the environment. In some embodiments, the control module 220 aggregates a series of positioning information 254 received from the speaker unit 204 in order to track the change in position that the speaker unit 204 experiences over a given time period. In such instances, the control module 220 processes the aggregated positioning information 254 to determine the current position of the speaker unit 204. For example, the control module 220 compares successive sets of positioning information 254 to determine that the speaker unit 204 is no longer in motion. Upon determining that the speaker unit 204 is stationary, the control module 220 uses the aggregated positioning information 254 to determine the overall change in position and determine the current position of the now-stationary speaker unit 204. The control module 220 additionally uses the current position of the speaker unit 204 to determine the direction of the target listening area relative to the speaker unit 204.

In various embodiments, the control module 220 generates a set of filters 222 for the hub speaker unit 202 and/or the speaker units 204. The filters 222 include one or more filters that modify an input audio signal. In various embodiments, a given filter 222 modifies the input audio signal by adding directivity information to the audio signal. For example, the filter 222 can include various digital signal processing (DSP) coefficients that steer the generated soundwave in a specific direction. In such instances, the generated filtered audio signal is used to generate a soundwave in the direction specified in the filtered audio signal. For example, the hub speaker unit 202 can generate a filter 222(1) for the speaker unit 204. When the output rendering module 270 uses the filter on the positioning information 254, the generated filtered audio signal includes directivity information corresponding to the direction of the target listening area relative to the speaker unit 204. When the output rendering module 270 subsequently drives the loudspeakers 248 with the filtered audio signal, the loudspeakers 248 generate a soundwave in the direction specified in the filtered audio signal.

In some embodiments, the control module 220 generates separate filters 222 for each loudspeaker 210 or subsets of the loudspeakers 248. In some embodiments, the control module 220 does not generate the filters for the speaker units 204. In such instances, the control module 220 generates one or more filters 222 for the loudspeakers 210 while the positioning module 260 operating on each of the respective speaker units 202, 204 generates one or more filters 222 for the loudspeakers 248 included in the speaker unit 204. Alternatively, the control module 220 generates a set of filters for each speaker unit 202, 204 and update the filters for a specific speaker unit 204 when the speaker unit 204 moves. For example, the control module 220 can initially generate a set of filters 222 that includes separate filters for each respective loudspeakers 210 included in the hub speaker unit 202. Upon determining that a specific speaker unit 204 has moved, the control module 220 then determines the current position of the speaker unit 204 and generates a separate filter (e.g., the filter 222(1)) for the subset of loudspeakers 248 included in the speaker unit 204 to generate a soundwave in a specific direction.

In some embodiments, the control module 220 generates each of the filters independently. For example, upon determining that the speaker unit 204(1) has moved, the control module 220 generates an updated filter 222(1) for the specific speaker unit 204(1). Alternatively, the control module 220 updates multiple filters 222. For example, upon determining that the speaker unit 204(1) has moved, the control module 220 can determine each of the positions in a given arrangement and update each of the filters 222 in order for the respective speaker units 202, 204 to generate a sound field in the target listening area. In some embodiments, the output rendering module 226 uses multiple filters to modify the audio signal. For example, the output rendering module 226 can use the filter 222 to add directivity information to the audio signal and can use separate filters (not shown), such as equalization filters, spatialization filters, etc., to further modify the audio signal.

The position data 224 is a dataset that includes positional information for one or more locations within the listening environment. In some embodiments, the position data 224 includes specific coordinates relative to a reference point. For example, the position data 224 can store the current positions and/or orientations of each respective speaker unit 204 and/or each of the specific loudspeakers 248 within each respective speaker unit 204 as a distance and angle from a specific reference point. In some embodiments, the position data 224 can include additional orientation information, such as a set of angles (e.g., $\{\mu, \varphi, \psi\}$) relative to a normal orientation. In such instances, the position and orientation of a given loudspeaker 210, 248 and/or speaker unit 202, 204 is stored in the position data 224 as a set of distances and angles relative to a reference point. In various embodiments, the position data 224 also includes computed directions between points. For example, the control module 220 can compute the direction of the target listening area relative to the position and orientation of the speaker unit 204 and can store the direction as a vector in the position data 224. In such instances, the control module 220 retrieves the stored direction when generating the filter 222(1) for the speaker unit 204.

In various embodiments, the hub speaker unit 202, the speaker unit 204, or a combination of hub speaker unit 202 and speaker unit 204 process various sensor data to generate the position data 224 that is used to determine positions and/or orientations of various units within the listening environment. In such instances, the hub speaker unit 202 or the speaker unit 204 process the position data 224(1) for the speaker unit 204 to generate the filter 222(1) for the speaker unit. Additionally or alternatively, the hub speaker unit 202 or the speaker unit 204 use the filter 222 to generate a filtered audio signal from a given input audio signal. The speaker unit 204 reproduces the filtered audio signal to generate soundwaves within the listening environment.

In various embodiments, the hub speaker unit 202 or the speaker unit 204 determines the position data 224(1) from aggregating a set of positioning information 254. In one example, the speaker unit 204 transmits a series of messages to the hub speaker unit 202 that includes positioning information 254 at various times during the motion of the speaker unit 204. In such instances, the control module 220 determines whether the speaker unit 204 has stopped moving and, upon making the determination, aggregates the positioning information 254 to determine the trajectory from a starting location and the position of the now-stationary speaker unit 204. Aggregating and processing the positioning information 254 upon determining that the speaker unit 204 has stopped moving reduces the processing resources that the hub speaker unit 202 employs, such as processor threads, cache memory, and so forth, to determine the position of the speaker unit 204, as the hub speaker unit 202 can determine an endpoint position of the speaker unit 204 in lieu of continually determining the position of the speaker unit 204 as the speaker is moving.

In another example, the speaker unit 204 generates sensor data at various times during the motion as positioning information 254. Upon determining that the speaker unit 204 is no longer in motion, the positioning module 260 aggregates the positioning information from the location where an initial motion was detected to determine the current position. Upon determining the current position, the positioning module 260 stores the current position of the speaker unit 204 in the position data 224(1) and/or transmits the current position as positioning information 254 to control module 220.

Alternatively, in some embodiments, the hub speaker unit 202 and/or the speaker unit 204 determine the position data 224(1) for the speaker unit 204 using other types of positioning algorithms. In various examples, the hub speaker unit 202 and/or the speaker unit 204 execute various types of triangulation algorithms to determine the current position of the speaker unit 204 upon determining that the speaker unit 204 is no longer moving. When performing such triangulation algorithms, the hub speaker unit 202 and/or the speaker unit 204 use various quantities of emitters and/or detectors to acquire various types of data (e.g., synchronization signals, timing signals, auditory sensor data, optical sensor data, angular rotation data, etc.) to determine the current position and/or current orientation of the now-stationary speaker unit 204. Performing such positioning algorithms reduces the computing resources that the hub speaker unit 202 and/or the speaker unit 204 use to determine the position of the speaker unit 204. For example, by performing the positioning algorithms just to the times where the speaker unit 204 has stopped moving reduces the processing resources that the hub speaker unit 202 and/or the speaker unit 204 employs to performing the positioning algorithms. Further, the modular speaker system 200 frees bandwidth associated with transmitting messages between the hub speaker unit 202 and the speaker unit 204 that are used to determine the position of the speaker unit 204, as the modular speaker system 200 does not transmit messages when the speaker unit 204 does not move.

In some embodiments, the hub speaker unit 202 includes a single emitter and the speaker unit 204 includes multiple detectors. The hub speaker unit 202 emits one or more types of signals, such as subsonic pulses, ultrasonic pulses, and so forth. In such instances, the speaker unit 204 generates positioning information 254 that includes the times at which each of the detectors included in the speaker unit 204 receives the signal emitted by the hub speaker unit 202. By comparing the times at which each of detectors included in the speaker unit 204 receives the signal to the time when the hub speaker unit 202 emitted the signal, a respective distance between the emitter in the hub speaker unit 202 and the detectors included in the speaker unit 204 is determined. The respective distances and the known separation between the detectors are then used to determine the current position of the speaker unit 204 relative to the hub speaker unit 202. In some examples, the time when the hub speaker unit 202 emits the signal is communicated to the speaker unit 204 by sending a message with the time of emission or emitting a pulse (e.g., using RF, infrared, and/or some other speed of light medium) to the speaker unit 204 when the signal is emitted. In some embodiments, the speaker unit 204 transmits the positioning information 254 for processing by the control module 220 to determine the current position of the speaker unit 204 and store the current position as position data 224. Alternatively, in some embodiments, the positioning module 260 operating in the speaker unit 204 processes the information and stores the determined current position as the position data 224(1).

In some embodiments, the speaker unit 204 includes a single emitter and the hub speaker unit 202 includes multiple detectors. The speaker unit 204 emits one or more types of signals, such as subsonic pulses, ultrasonic pulses, and so forth. In such instances, the hub speaker unit 202 generates positioning information 254 that includes the times at which each of the detectors included in the hub speaker unit 202 receives the signal emitted by the speaker unit 204. By comparing the times at which each of detectors included in the hub speaker unit 202 receives the signal to the time when the speaker unit 204 emitted the signal, a respective distance between the emitter in the speaker unit 204 and the detectors included in the hub speaker unit 202 is determined. The respective distances and the known separation between the detectors are then used to determine the current position of the speaker unit 204 relative to the hub speaker unit 202. In some examples, the time when the speaker unit 204 emits the signal is communicated to the hub speaker unit 202 by sending a message with the time of emission or emitting a pulse (e.g., using RF, infrared, and/or some other speed of light medium) to the hub speaker unit 202 when the signal is emitted. In some embodiments, the hub speaker unit 202 transmits the positioning information 254 for processing by the positioning module 260 to determine the current position and/or orientation of the speaker unit 204 and store the current position and/or orientation as position data 224(1). Alternatively, in some embodiments, the control module 220 operating in the hub speaker unit 202 processes the information and stores the determined current position and/or orientation as a portion of the position data 224.

In some embodiments, the hub speaker unit 202 includes multiple emitters and the speaker unit 204 includes a single detector. The hub speaker unit 202 emits one or more types of signals, such as subsonic pulses, ultrasonic pulses, and so forth, from each of the respective emitters. In such instances, the speaker unit 204 generates positioning information 254 that includes the times at which the detector included in the speaker unit 204 receives each of the respective signals emitted by the emitters. By comparing the times at which the detector included in the speaker unit 204 receives the respective signals to the time when the hub speaker unit 202 emitted the respective signals, a respective distance between the respective emitters in the hub speaker unit 202 and the detector included in the speaker unit 204 is determined. The respective distances and the known separation between the emitters are then used to determine the current position of the speaker unit 204 relative to the hub speaker unit 202. In some examples, the time or times when the hub speaker unit 202 emits the respective signals is communicated to the speaker unit 204 by sending a message with the time(s) of emission or emitting a pulse (e.g., using RF, infrared, and/or some other speed of light medium) to the speaker unit 204 when the respective signals are emitted. In some embodiments, the speaker unit 204 transmits the positioning information 254 for processing by the control module 220 to determine the current position of the speaker unit 204 and store the current position as a portion of the position data 224. Alternatively, in some embodiments, the positioning module 260 operating in the hub speaker unit 202 processes the information and stores the determined current position as the position data 224(1).

In some embodiments, the speaker unit 204 includes multiple emitters and the hub speaker unit 202 includes a single detector. The speaker unit 204 emits one or more types of signals, such as subsonic pulses, ultrasonic pulses, infrared signals, and so forth, from each of the respective emitters. In such instances, the hub speaker unit 202 generates positioning information 254 that includes the times at which the detector included in the hub speaker unit 202 receives each of the respective signals emitted by the emitters. By comparing the times at which the detector included in the hub speaker unit 202 receives the respective signals to the time when the speaker unit 204 emitted the respective signals, a respective distance between the respective emitters in the speaker unit 204 and the detector included in the hub speaker unit 202 is determined. The respective distances and the known separation between the emitters are then used to determine the current position of the speaker unit 204 relative to the hub speaker unit 202. In some examples, the time or times when the speaker unit 204 emits the respective signals is communicated to the hub speaker unit 202 by sending a message with the time(s) of emission or emitting a pulse (e.g., using RF, infrared, and/or some other speed of light medium) to the hub speaker unit 202 when the respective signals are emitted. In some embodiments, the hub speaker unit 202 transmits the positioning information 254 for processing by the positioning module 260 to determine the current position and/or orientation of the speaker unit 204 and store the current position and/or orientation as the position data 224(1). Alternatively, in some embodiments, the control module 220 operating in the hub speaker unit 202 processes the information and stores the determined current position and/or orientation as a portion of the position data 224.

In some embodiments, the speaker unit 204 includes one or more magnetometers or other orientation sensors that are used to determine an orientation of the speaker unit 204 relative to a fixed direction (e.g., magnetic north). Similar sensors in the hub speaker unit 202 are used to determine an orientation of the hub speaker unit relative to the same fixed direction. The difference between the orientation of the speaker unit 204 and the orientation of the hub speaker unit 202 is then used to determine the orientation of the speaker unit 204 relative to the hub speaker unit 202. In some other embodiments, the speaker unit 204 or the hub speaker unit 202 include directional detectors that are usable to determine the direction(s) from which the signals used to determine the position of the speaker unit 204 are received. The direction(s) from which the signals are received are then used to determine the orientation of the speaker unit 204 relative to the hub speaker unit 202.

In some embodiments, the hub speaker unit 202 computes the orientation of the speaker unit 204. In such instances, the control module 220 stores the orientation as a portion of the position data 224, or transmits the orientation in the positioning information 254 for the positioning module 260 to store the orientation as the position data 224(1). Alternatively, in some embodiments, the positioning module 260 operating in the speaker hub determines the orientation. In such instances, the positioning module 260 stores the orientation in the position data 224(1), or transmits the orientation in the positioning information 254 for the control module 220 to store the orientation as a portion of the position data 224.

The output rendering module 226 processes an audio signal and renders the audio signal by driving the loudspeakers 210 to generate one or more soundwaves corresponding to the audio signal. In various embodiments, the output rendering module 226 is a DSP that processes a given input audio signal by using a filter 222 having specific DSP coefficients to generate a filtered audio signal that steer a generated soundwave in a specific direction. In such instances, the output rendering module 226 renders the filtered audio signal to generate soundwaves. As discussed above, using the filters 222 adds directivity information to the filtered audio signal such that the hub speaker unit 202 rendering of the filtered audio signal generates a soundwave in a specific direction. In some embodiments, the output rendering module 226 processes the audio by separating the audio signal into separate spatialized audio signals. In such instances, the produced soundwaves cause the listener to hear portions of the audio as originating at a specific location (e.g., an explosion occurring on the right side of the listening environment).

The sensors 216 include various types of sensors that acquire data about the listening environment. For example, the hub speaker unit 202 can include auditory sensors to receive several types of sound (e.g., subsonic pulses, ultrasonic sounds, speech commands, etc.). In some embodiments, the sensors 216 includes other types of sensors. Other types of sensors include optical sensors, such as RGB cameras, time-of-flight cameras, infrared cameras, depth cameras, a quick response (QR) code tracking system, motion sensors, such as an accelerometer or an inertial measurement unit (IMU) (e.g., a three-axis accelerometer, gyroscopic sensor, and/or magnetometer), pressure sensors, and so forth. In addition, in some embodiments, sensor(s) 216 can include wireless sensors, including radio frequency (RF) sensors (e.g., sonar and radar), and/or wireless communications protocols, including Bluetooth, Bluetooth low energy (BLE), cellular protocols, and/or near-field communications (NFC).

In various embodiments, the control module 220 uses the sensor data acquired by the sensors 216 to generate the positioning information 254 and/or the position data 224. For example, the hub speaker unit 202 includes one or more emitters that emit the positioning signals described above, where the hub speaker unit 202 and/or the speaker unit 204 include detectors that generate auditory data that includes the positioning signals. The control module 220 processes the received auditory data. The control module 220 determines that the auditory data represents the speaker unit 204 reflecting the positioning signals and uses timing data, such as the time between the emission of positioning signals and the reflection of the positioning signal, in order to determine the position and/or orientation of the speaker unit 204. In some embodiments, the control module 220 combines multiple types of sensor data to track the motion of the speaker unit 204. For example, the control module 220 can combine auditory data and optical data (e.g., camera images or infrared data) in order to determine the position and orientation of the speaker unit 204 at a given time.

The I/O device interface 218 includes any number of different I/O adapters or interfaces used to provide the functions described herein. For example, the I/O device interface 218 could include wired and/or wireless connections, and can use various formats or protocols. In another example, the hub speaker unit 202, through the I/O device interface 218, could receive sensor data from the sensors 216, input signals, and/or messages via input devices, and can provide output signals to output device(s) to produce outputs in various forms (e.g., ultrasonic pulses generated an ultrasonic emitter).

The speaker unit 204 is included in a group of one or more speaker units 204 that operate in conjunction with the hub speaker unit 202. In various embodiments, the speaker unit 204 is a wireless device that includes a separate power source than the hub speaker unit 202 and can drive the loudspeakers 248 using the power source, for example, the speaker unit 204 can include one or more batteries that provide power to the processor 242 and the loudspeakers 248. In various embodiments, the speaker unit 204 use one or more sensors 246 and/or the motion sensors 252 to detect that the speaker unit 204 is moving. In such instances, the one or more sensors 246 and/or the motion sensors 252 acquire sensor data. The positioning module 260 processes the acquired sensor data to generate the positioning information 254. In some embodiments, the positioning module 260 uses the positioning information 254 to generate the position data 224(1) and generate the filter 222(1) for the speaker unit 204. Alternatively, in some embodiments, the speaker unit 204 transmits the positioning information 254 to the hub speaker unit 202 as one or more messages and/or data packets using a wired or wireless communications media. For example, the speaker unit 204, upon acquiring a set of positioning information 254 can generate a message that includes the positioning information 254 in the payload and wirelessly transmits the message over a WiFi or Bluetooth communication channel. In such instances, the control module 220 generates the filter 222(1). In such instances, the speaker unit 204 receives the filter 222(1) from the hub speaker unit 202 for use by the output rendering module 270.

The processor 242 can be any suitable processor, such as a central processing unit (CPU), a graphics processing unit (GPU), an application-specific integrated circuit (ASIC), a field programmable gate array (FPGA), a digital signal processor (DSP), and/or any other type of processing unit, or a combination of different processing units, such as a CPU configured to operate in conjunction with a GPU. In general, the processor 242 can be any technically-feasible hardware unit capable of processing data and/or executing software applications.

Memory 244 can include a random-access memory (RAM) module, a flash memory unit, or any other type of memory unit or combination thereof. The processor 242 is configured to read data from and write data to memory 244. In various embodiments, the memory 244 includes non-volatile memory, such as optical drives, magnetic drives, flash drives, or other storage. In some embodiments, separate data stores, such as an external included in the network 208 can supplement the memory 214. The positioning module 260 and/or the output rendering module 270 within memory 244 can be executed by the processor 242 to implement the overall functionality of the speaker unit 204 and, thus, to coordinate the operation of the modular speaker system 200 as a whole. In various embodiments, an interconnect bus (not shown) connects the processor 242, the memory 244, the loudspeakers 248, the I/O device interface 218, the sensors 216, and any other components of the speaker unit 204.

The positioning module 260 has similar functionality to the control module 220 operating in the hub speaker unit 202. In various embodiments, the positioning module 260 processes sensor data acquired by the sensors 246 and/or the motion sensors 252 to generate the positioning information 254. In some embodiments, the positioning module 260 transmits the positioning information 254 to the hub speaker unit 202 using one or more messages and/or data packets using a wired or wireless communications medium for processing by the control module 220. In such instances, the speaker unit 204 receives the position data 224(1) from the hub speaker unit 202. Alternatively, in some embodiments, the positioning module 260 processes the positioning information 254 to determine the current position of the speaker unit 204 and stores the current position as the position data 224(1).

In some embodiments, the positioning module 260 determines whether the speaker unit 204 is moving or is stationary in lieu of the hub speaker unit 202. For example, the positioning module 260 can receive an indication that the speaker unit 204 is moving from another component in the speaker unit 204. For example, when the speaker unit 204 is a detachable speaker, the positioning module 260 can receive an indication signal that the speaker unit 204 has become detached from a connection point to the hub speaker unit 202, such as a charging port on the hub speaker unit 202, or another fixed point. In another example, the speaker unit 204 can receive acceleration data from one or more accelerometers and/or an inertial measurement unit indicating movement from a stationary position. In such instances, the positioning module 260 causes the motion sensors 252 to activate and acquire sensor data associated with the movement of the speaker unit 204.

Additionally or alternatively, in some embodiments, the positioning module 260 generates the filter 222(1) based on the position data 224(1) in lieu of receiving the filter 222(1) from the hub speaker unit 202. For example, the positioning module 260 can use the position data 224(1) stored in the memory 244 to determine a direction of the target listening area relative to the current position of the speaker unit 204. The positioning module 260 then generates a filter 222(1) for the output rendering module 270 to use to add the direction to a given audio signal when generating a filtered audio signal.

The sensors 246 include various types of sensors that acquire data about the listening environment. For example, the sensors 246 can include auditory sensors to receive various types of sound (e.g., subsonic pulses, ultrasonic sounds, speech commands, etc.). In some embodiments, the sensors 246 can include other types of sensors. Other types of sensors include optical sensors, such as RGB cameras, time-of-flight cameras, infrared cameras, depth cameras, and/or a quick response (QR) code tracking system. In addition, in some embodiments, the sensor(s) 246 can include wireless sensors, including radio frequency (RF) sensors (e.g., sonar and radar), and/or wireless communications protocols, including Bluetooth, Bluetooth low energy (BLE), cellular protocols, and/or near-field communications (NFC).

In various embodiments, the positioning module 260 uses the sensor data acquired by the sensors 246 to generate the position data 224(1). For example, when the hub speaker unit 202 uses one or more emitters to emit positioning signals, the speaker unit 204 includes one or more detectors that generates auditory data that includes the positioning signals and the positioning module 260 processes the received auditory data. The positioning module 260 determines that the auditory data corresponds to the speaker unit 204 receiving the positioning signals at the current position and/or orientation and uses the timing data, such as a determined time between the emitters transmitting the positioning signals and the time that the detectors received the positioning signals to determine the current position and/or orientation of the speaker unit 204.

The I/O device interface 250 includes any number of different I/O adapters or interfaces used to provide the functions described herein. For example, the I/O device interface 250 could include wired and/or wireless connections, and can use various formats or protocols. In another example, the speaker unit 204, through the I/O device interface 250, could receive sensor data from the sensors 246 and/or the motion sensors 252, input signals, and/or messages via input devices, and can provide output signals to output device(s) to produce outputs in various types (e.g., ultrasonic pulses generated an ultrasonic emitter).

The motion sensors 252 include one or more position sensors, such as one or more accelerometers and/or an IMU. The IMU is a device like a three-axis accelerometer, gyroscopic sensor, and/or magnetometer. In some embodiments, the motion sensors 252 include multiple types of sensors and a sensor fusion hub that combines different types of sensor data. For example, the sensor fusion hub can combine changes detected by the IMU with acceleration data from the accelerometer. Other configurations of the motion sensors 252 are possible. For example, the speaker unit 204 includes a set of optical sensors, a set of auditory sensors, and/or timing circuits as part of the motion sensors 252. In such instances, the hub speaker unit 202 and/or the speaker unit 204 include the set of optical sensors and/or set of auditory sensors or detectors to acquire various types of test signals and use the timing circuit to perform various triangulation techniques to determine the current position of the speaker unit 204, such as is described in further detail above. For example, the motion sensors 252 includes auditory sensors that detect auditory signals, such as subsonic or ultrasonic pulses generated by the hub speaker unit 202 at specific times. In such instances, the sensor fusion hub combines the auditory data with timing data generated by the timing circuit to determine the current position and/or orientation of the speaker unit 204.

In some embodiments, the positioning module 260 processes the multiple types of sensor data to generate the positioning information 254 corresponding to the motion of the speaker unit 204. For example, the positioning module 260 can process the data provided by the sensor fusion hub to determine the amount of movement (e.g., change in distance and/or orientation) that has occurred since a previous measurement. In some embodiments, the positioning module 260 combines sensor data acquired from the motion sensors 252 with sensor data acquired from the other sensors 246.

In some embodiments, the speaker unit 204 activates the motion sensors 252 upon detecting a detachment of the speaker unit 204 from a connection point. In such instances, the positioning module 260 activates the motion sensors 252 to acquire sensor data upon detecting the detachment and deactivate the motion sensors 252 upon determining that the speaker unit 204 is no longer moving.

The output rendering module 270 operates similarly to the output rendering module 226 by processing the audio signal 256 and rendering the audio signal 256. The output rendering module 270 renders the audio signal 256 by driving the loudspeakers 248 to generate one or more soundwaves corresponding to the audio signal 256. In some embodiments, the output rendering module 270 receives the audio signal 256 directly from the audio source 206. Alternatively, the hub speaker unit 202 streams the audio signal 256 to the speaker unit 204 over a media channel, such as a wired or wireless media channel. In various embodiments, the output rendering module 270 is a DSP that processes a given input audio signal by using a filter 222(1) to generate a filtered audio signal. In such instances, the output rendering module 270 renders the filtered audio signal to generate soundwaves. As discussed above, using the filter 222(1) adds directivity information to the filtered audio signal such that the speaker unit 204 rendering of the filtered audio signal generates a soundwave in a specific direction. In some embodiments, the output rendering module 270 processes the audio by separating the audio signal into separate spatialized audio signals. In such instances, the produced soundwaves cause the listener to hear portions of the audio as originating at a specific location (e.g., an explosion occurring on the right side of the listening environment).

The network 208 includes a plurality of network communications systems, such as routers and switches, configured to facilitate data communication between the hub speaker unit 202, the speaker unit 204, and or other external devices. Persons skilled in the art will recognize that many technically-feasible techniques exist for building the network 208, including technologies practiced in deploying an Internet communications network. For example, the network 208 can include a wide-area network (WAN), a local-area network (LAN), and/or a wireless (Wi-Fi) network, among others.

The audio source 206 generates one or more audio source signals to be delivered to at least one of hub speaker unit 202 and/or the speaker unit 204. The audio source 206 can be any type of audio device, such as a personal media player, a smartphone, a portable computer, a television, etc. In some embodiments, the hub speaker unit 202 and/or speaker unit 204 receive one or more audio source signals directly from audio source 206. The respective output rendering module 226 and/or the output rendering module 270 included in the respective speaker units 202, 204 can then generate soundwaves based on the audio signal 256 received from the audio source 206 to generate the sound field at the target listening area.

Motion Detection of Satellite Speaker Devices

Figure 3:
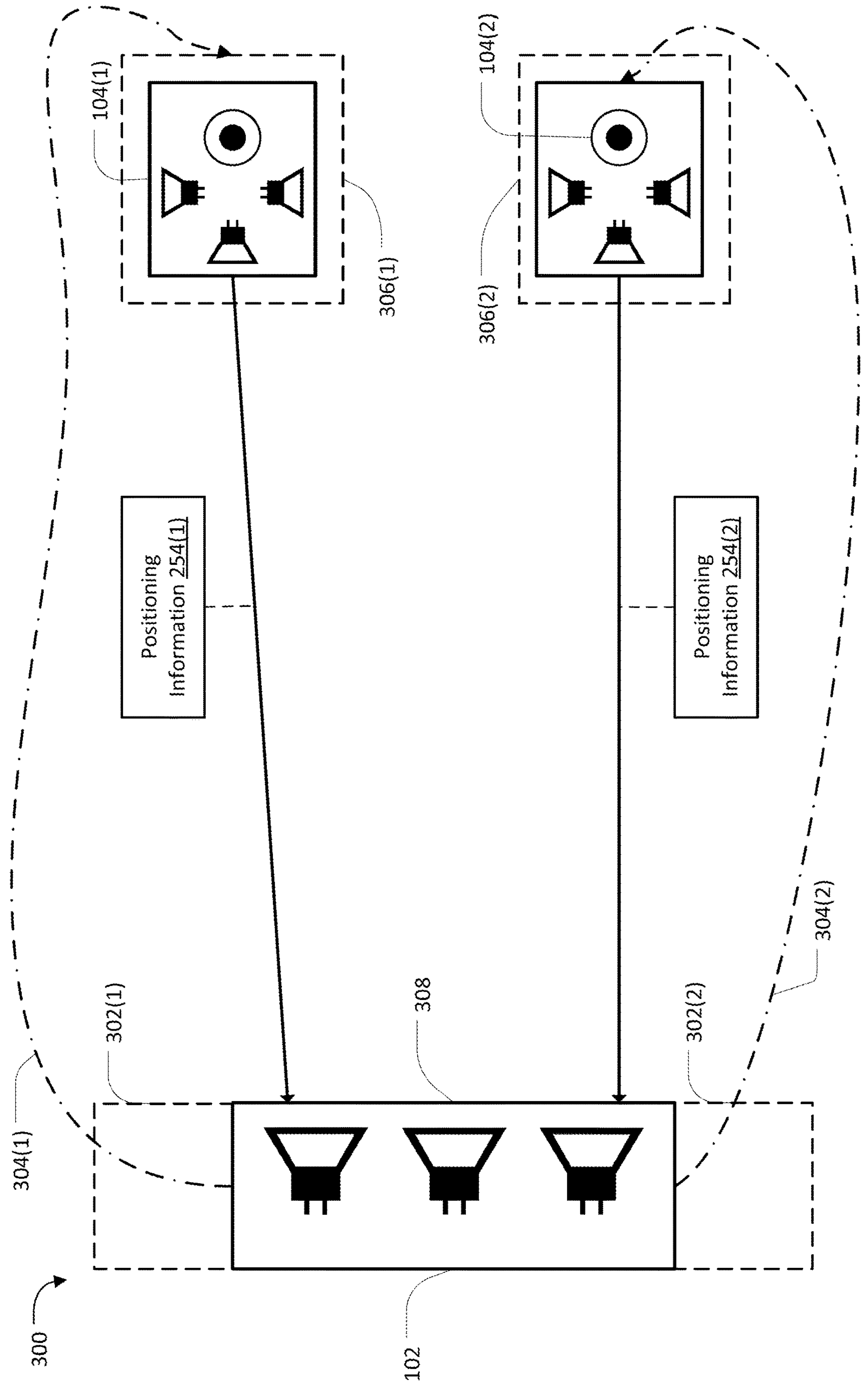
FIG. 3 is a schematic diagram of the speaker units included in the modular speaker system of FIG. 2 operating to transmit positioning information to a hub speaker unit, according to various embodiments of the present disclosure.

FIG. 3 is a schematic diagram 300 of the speaker units included in the modular speaker system 200 of FIG. 2 operating to transmit positioning information to a hub speaker unit, according to various embodiments of the present disclosure. In operation, the modular speaker system 200 changes from a first arrangement to a second arrangement when one or more speaker units 204 (e.g., 204(1), 204(2)) move from first locations 302 (e.g., 302(1), 302(2)) to second locations 306 (e.g., 306(1), 306(2)). When a given speaker unit 204 is moving, the positioning information 254 generated reflects the trajectory 304 of the speaker unit 204. In various embodiments, the position and/or orientation of the speaker unit 204 at the second location 306 is determined using the positioning information 254.

In various embodiments, at least one of the hub speaker unit 202 or speaker unit 204 generates the positioning information 254. For example, as shown, each of the speaker units 204 generate positioning information 254 (e.g., 254(1), 254(2)) that indicate the respective trajectories 304 (e.g., 304(1), 304(2)) of the movement that speaker unit 204 experienced when moving from the first location 302. In such instances, the speaker units 204 transmits the positioning information 254 to the hub speaker unit 202 and the hub speaker unit 202 generates filters for the speaker units 204 based on the respective position and orientation at the second location 306.

Alternatively, in some embodiments, the hub speaker unit 202 generates the positioning information 254 based on sensor data acquired by the hub speaker unit 202. For example, the control module 220 can process optical data (e.g., camera images, infrared data, etc.) to determine changes in the position of the speaker unit 204(2) over a given time period. In such instances, the control module 220 determines relative coordinates and/or orientations over successive periods to determine the trajectory 304(2) of the speaker unit 204(2).

In various embodiments, the position and/or orientation of the speaker unit 204 is determined as a relative change with respect to the position and/or orientation of the speaker unit 204 at the first location. For example, when the control module 220 processes the positioning information 254(1), the current position and orientation of the speaker unit 204(1) can be stored as a series of position information $P_1$, $P_2$ that includes initial coordinates and orientation, and a relative change between the first position and the second position:

$$P_1=\{0,0,0,0,0\} \rightarrow P_2=\{6.5\text{ m},20°,180°,0°,0°\} \quad (1)$$

Where the $P_1$ in (1) represents the initial set and $P_2$ represents the relative change from $P_1$. The relative change indicates that the position and orientation of the speaker unit 204(1) at the second location 306(1) is modified by a distance of 6.5 m and 20° from the initial location 302(1). The relative change also indicates that the orientation of the speaker unit 204(1) has been moved 180° from the orientation at the first location 302(1).

Alternatively, in some embodiments, the position and/or orientation of the speaker unit 204 can be determined as a relative change with respect to a reference point 308. In such instances, the reference point is a relatively fixed point, such as a location on the hub speaker unit 202 that is set during initial calibration. In such instances, the control module 220 and/or the output rendering module 270 determines the position of the speaker unit 204 at any given location 302, 306 as a relative change in position from the reference point 308.

In various embodiments, when a given speaker unit 204 changes from the second position to a third position (not shown), the hub speaker unit 202 and/or speaker unit 204 detects the motion from the second position. For example, one or more of the motion sensors 252, such the accelerometer and/or the IMU in the speaker unit 204, can detect a change in acceleration. In another example, the hub speaker unit 202 can compare camera images and detect a change in position. In some embodiments, the hub speaker unit 202 and/or speaker unit 204 shuts off one or more of the sensors 216, 246, 252 upon determining that the speaker unit 204 is stationary. In such instances, the hub speaker unit 202 and/or speaker unit 204 activates sensors 216, 246, 252 to determine the positioning information 254 from the second location when motion to the third location is detected.

Figure 4:
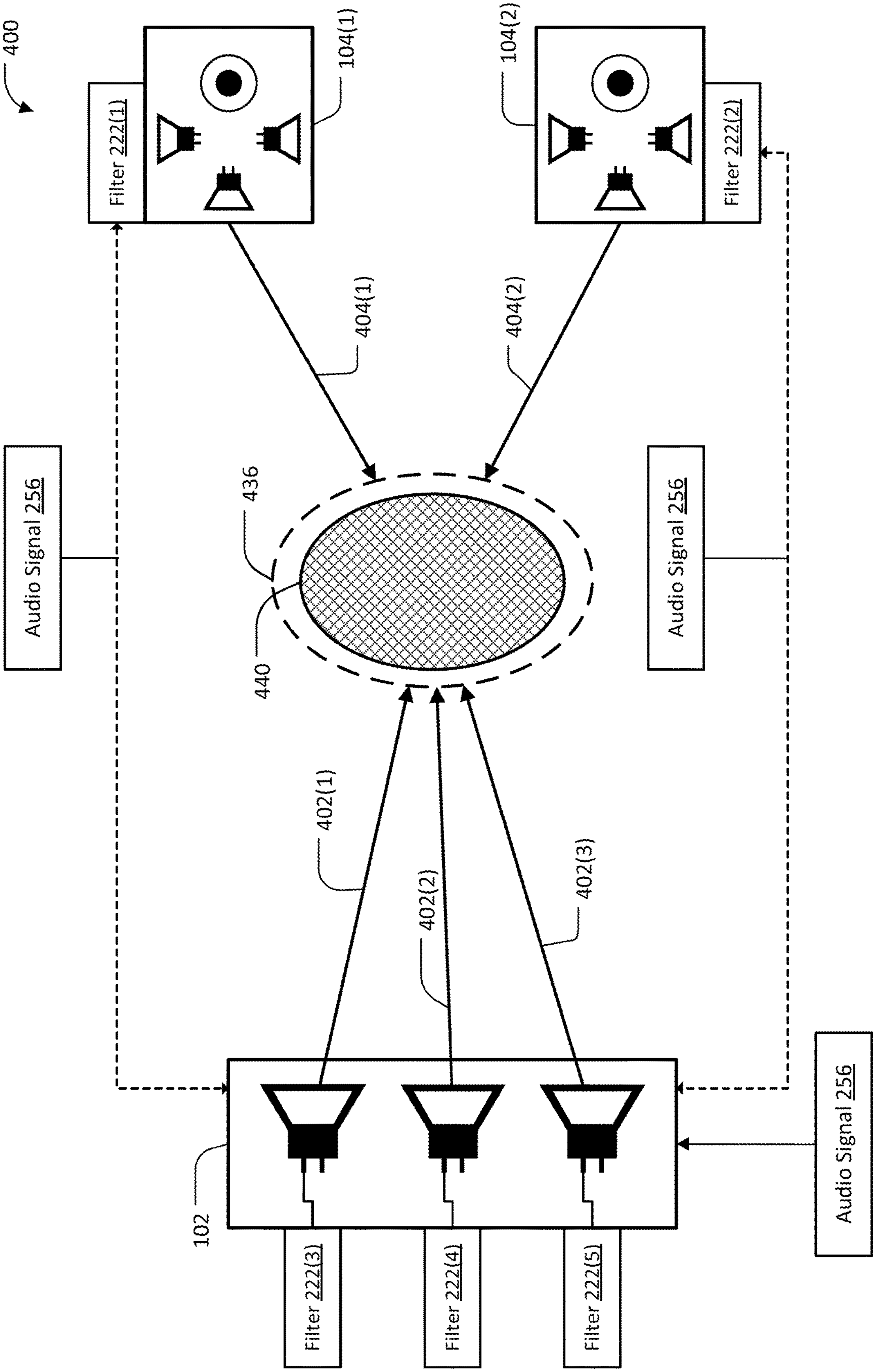
FIG. 4 is a schematic diagram of the hub speaker and the additional speaker units included in the modular speaker system of FIG. 2 operating to generate a sound field for a target listening area, according to various embodiments of the present disclosure.

FIG. 4 is a schematic diagram 400 of the hub speaker unit 202 and the speaker units 204(1), 204(2) included in the modular speaker system 200 of FIG. 2 operating to generate a sound field 436 for a target listening area 440, according to various embodiments of the present disclosure. In operation, each speaker unit 202, 204, includes one or more filters 222 that the control module 220 and/or the positioning module 260 generate. The filters include DSP coefficients that are based on directions generated between the target listening area 440 and the respective positions and orientations of the hub speaker unit 202 and the speaker units 204(1), 204(2). A given set of DSP coefficients enable the filtered audio signal generated from the filter 222 to steer a given soundwave 402, 404 produced by one or more loudspeakers 210, 248 in a specific direction. The respective soundwaves 402 (e.g., 402(1), 402(2), 402(3)) and 404 (e.g., 404(1), 404(2)) combine to generate a sound field 436 that encompasses the target listening area 440.

The target listening area 440 corresponds to the listening area for one or more listeners for the modular speaker system 200. In some embodiments, the control module 220 and/or positioning module 260 estimate the target listening area 440. For example, the control module 220 can estimate the target listening area 440 as an area with a centroid at a predetermined distance and orientation (e.g., approximately 3 m and 0°) from the reference point 308. Alternatively, the control module 220 can detect the target listening area 440 from other inputs and/or devices. For example, the control module 220 can analyze image data to estimate where the listeners are positioned. In another example, the control module 220 can receive passive infrared data from a remote control or can detect a listener and/or a token proximate to listener to approximate the location of the user. In such instances, the control module 220 determines the location of the target listening area 440, store the location in the position data 224 and transmits a portion of the position data 224 as position data 224(1) to the speaker units 204 using or more messages and/or data packets using a wired or wireless communication medium for use when generating the filters 222.

In various embodiments, the control module 220 generates multiple filters (e.g., 222(3), 222(5), 222(5)) for each of the respective loudspeakers 210 included in the hub speaker unit 202. In such instances, each loudspeaker 210 produces a soundwave 402 that each have different directions. Alternatively, the control module 220 generates single filter 222 for the hub speaker unit 202. In such instances, the loudspeakers 210 generates a combined soundwave (e.g., 402(2)) that is directed towards the target listening area 440. Additionally or alternatively, the control module 220 generates a filter 222(1) for the speaker unit 204(1) and a separate filter 222(2) for the speaker unit 204(2). In such instances, the control module 220 transmits the respective filters 222(1), 222(2) using one or more messages and/or data packets using a wired or wireless communication medium to each speaker unit 204 independently.

When the positioning module 260 in a respective speaker unit 204 generates the filter 222 (e.g., the filter 222(2) for the speaker unit 204(2)), the positioning module 260 retrieves the location of the target listening area 440 from the position data 224(1) and determines the direction of the target listening area 440 relative to the position and orientation of the speaker unit 204. The positioning module 260 generates a filter 222 with DSP coefficients that steer a soundwave 404, generated by a subset of the loudspeakers 248, towards the target listening area 440.

In some embodiments, when reproducing an audio signal 256, each of the hub speaker unit 202 and speaker unit 204 receives the positioning information 254 directly. Alternatively, in some embodiments, the hub speaker unit 202 transmits the positioning information 254 to each of the speaker units 204 using one or more messages and/or data packets using a wired or wireless communication medium. For example, as shown, the hub speaker unit 202 receives the audio signal 256 and wirelessly transmits copies of the audio signal 256 to each speaker unit 204 using a media stream. In various embodiments, each filter 222 generates a separate filtered audio signal that includes the directivity information to steer the soundwave that is to be produced. In some embodiments, each of the speaker units 202, 204 is calibrated based on the distance to ensure that each soundwave 402, 404 is produced with a specific intensity and a delay such that all of the soundwaves 402, 404 reach the target listening area 440 synchronously to produce the sound field 436. As the filters 222(2) generate filtered audio signals that steer the soundwaves 404 of the speaker units 204 in the direction of the target listening area 440, the generated sound field 436 encompasses the target listening area 440 and provides an improved listening experience for the listeners within the target listening area 440.

Figure 5:
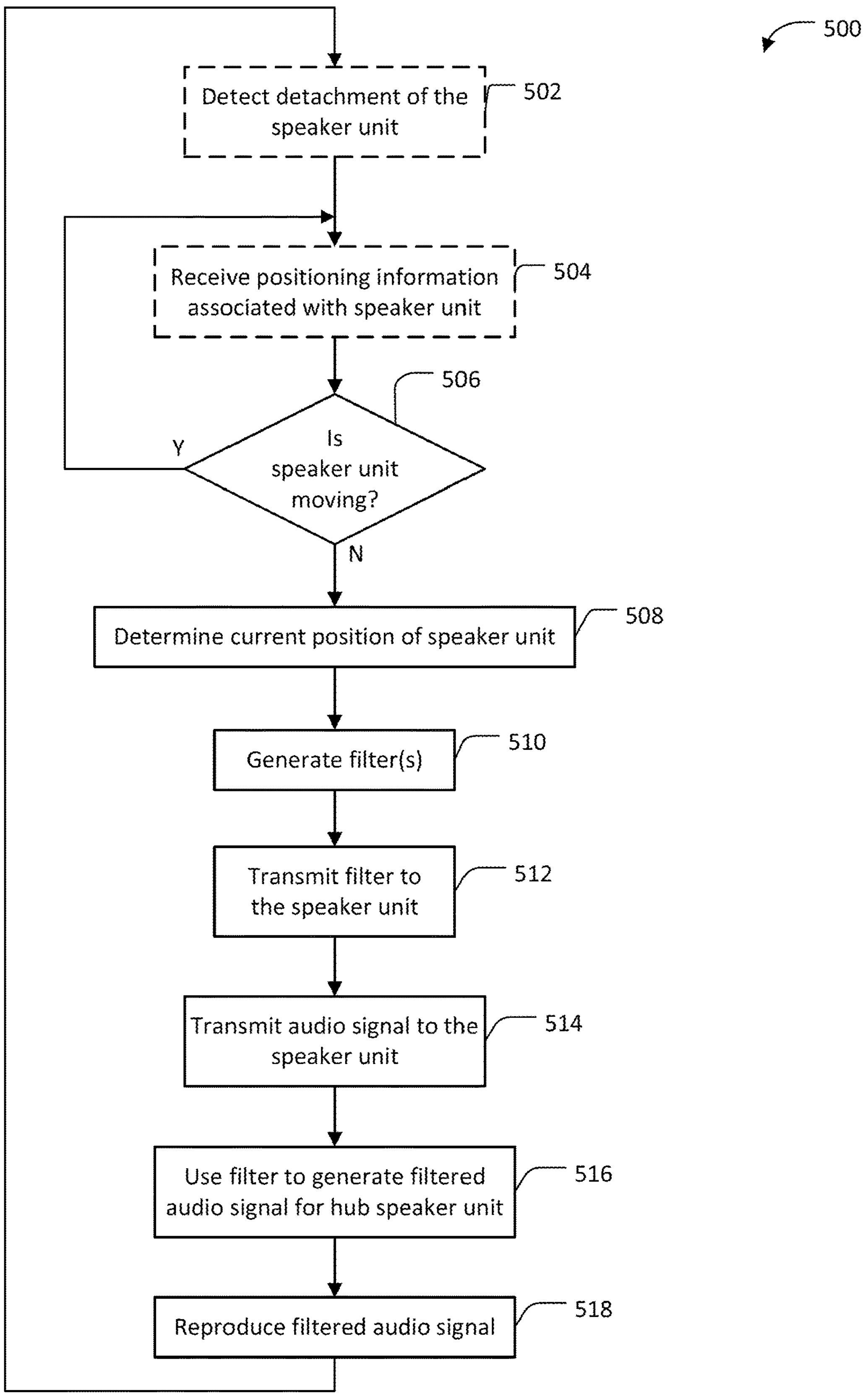
FIG. 5 is a flowchart of method steps for a hub speaker unit determining a position of a speaker unit based on positioning information to generate a filter for reproducing an audio signal, according to various embodiments of the present disclosure.

FIG. 5 is a flowchart of method steps for a hub speaker unit determining a position of a speaker unit based on positioning information to generate a filter for reproducing an audio signal, according to various embodiments of the present disclosure. Although the method steps are described with reference to the embodiments of FIGS. 1-4, persons skilled in the art will understand that any system configured to implement the method steps, in any order, falls within the scope of the present disclosure.

As shown, method 500 begins at step 502, where the hub speaker unit 202 optionally detects a detachment of the speaker unit 204. In some embodiments, the hub speaker unit 202 optionally detects the speaker unit 204 being detached from a fixed point, such as a charging port on the hub speaker unit 202. In such instances, the hub speaker unit 202 communicates with the speaker unit 204 to receive positioning information 254 while the speaker unit 204 is moving and/or an indication that the speaker unit 204 has stopped moving. For example, the control module 220 receives a signal indicating that the speaker unit 204 has been detached from a connection point to the hub speaker unit 202. In another example, the control module 220 processes received auditory data and determines that the auditory data includes a detachment sound corresponding to the speaker unit 204 being detached from the connection point. In such instances, the control module 220 communicates with the speaker unit 204 to receive positioning information 254 from the speaker unit 204.

At step 504, the hub speaker unit 202 optionally receives positioning information 254 associated with the speaker unit 204. In various embodiments, the control module 220 operating in the hub speaker unit 202 receives a signal indicating that the target listening area 440 is moving. In some embodiments, the signal corresponds to sensor data that the control module 220 interprets at an initiation of movement of the speaker unit 204. Alternatively, in some embodiments, the hub speaker unit 202 receives a notification message from the speaker unit 204 that the speaker unit 204 is moving. In various embodiments, the hub speaker unit 202, upon determining that the speaker unit 204 is moving, receives periodic messages from the speaker unit 204 that include the positioning information 254 corresponding to the movement of the speaker unit 204 through an environment over a time period.

In some embodiments, the positioning information 254 includes sensor data generated by the IMU (e.g., acceleration measurements, magnetic field measurements, angular rates, etc.) on the speaker unit 204 while moving. In such instances, the control module 220 receives and aggregates the positioning information 254 included in messages transmitted by the speaker unit 204 and determines the trajectory 304 of the speaker unit 204.

At step 506, the hub speaker unit 202 determines whether the speaker unit 204 is still moving. In some embodiments, the control module 220 processes the received positioning information 254 to determine whether the speaker unit 204 is still moving or is stationary. Alternatively, in some embodiments, the control module 220 receives a message from the speaker unit 204 indicating that the speaker unit 204 has stopped moving. For example, the positioning module 260, upon determining that the speaker unit 204 is stationary, causes the speaker unit 204 to transmit a request for a filter 222(1). In such instances, the control module 220 interprets the received filter request as an indication that the speaker unit 204 has stopped moving and is stationary.

When the control module 220 determines that the speaker unit 204 is still moving, the hub speaker unit 202 returns to step 504 to optionally receive additional positioning information 254. Otherwise, the hub speaker unit 202 determines that the speaker unit 204 is stationary and proceeds to step 508.

At step 508, the hub speaker unit 202 determines the current position of the speaker unit 204. In various embodiments, the control module 220 positioning information 254 to determine the current position and/or orientation of the now-stationary speaker unit 204. Upon determining the current position and/or orientation of the speaker unit 204, the hub speaker unit 202 stores the current position and/or orientation as a portion of the position data 224. In some embodiments, the control module 220 processes the positioning information 254 to determine the trajectory 304 of the speaker unit 204 from a previous location. The control module 220 uses various positioning techniques to identify the endpoint of the trajectory 304, where the position and/or orientation of the speaker unit 204 at the endpoint of the trajectory 304 corresponds to the current position and/or orientation of the speaker unit 204. The control module 220 then stores the current position and/or orientation as a portion of the position data 224.

Alternatively, in some embodiments, the control module 220 performs various positioning algorithms (e.g., triangulation using sensor data) to determine the current position and/or orientation of the now-stationary speaker unit 204. For example, any of the positioning and/or orientation algorithms discussed above with respect to FIG. 2 can be used to determine the current position and orientation at the second location 306 of the speaker unit 204.

In some embodiments, the position data 224 includes a reference position 308. In such instances, the control module 220 determines the current position and/or orientation of the hub speaker unit 202 and/or the speaker unit 204 relative to the reference position 308. For example, the hub speaker unit 202 determines a specific position of loudspeakers 210 within the hub speaker unit 202 relative to the reference position 308. In such instances, the control module 220 also determines the current position and/or orientation of the speaker unit 204 as a distance and set of angles relative to the reference position 308.

At step 510, the hub speaker unit 202 generates one or more filters 222 for the hub speaker unit 202 and the speaker unit 204. In various embodiments, the control module 220 generates filters 222 for each of the hub speaker unit 202 and the speaker unit 204 to use when reproducing audio signals. In some embodiments, the control module 220 determines one or more directions towards a target listening area 440 relative to the positions and orientations of the loudspeakers 248 within the speaker unit 204. In such instances, the control module 220 generates a filter 222(1) for the output rendering module 270 to use to generate a filtered audio signal. When the output rendering module 270 drives the loudspeakers 248 included in the speaker unit 204 with the filtered audio signal, a soundwave 404 is steered toward the direction of the target listening area 440 to generate a sound field that includes a sweet spot that encompasses the target listening area 440.

In some embodiments, the control module 220 generates DSP coefficients for a given filter 222 based on the position of the hub speaker unit 202 and/or the speaker unit 204. For example, the control module 220 generate a filter 222(1) for the speaker unit 204, where the filter 222(1) includes DSP coefficients that cause the loudspeakers 248 to generate a smaller soundwave 404 when positioned at a location proximate to the hub speaker unit 202. In another example, the control module 220 generates the filter 222(1) with DSP coefficients that cause the loudspeakers 248 to generate a larger soundwave 404 when positioned at a more remote location.

At step 512, the hub speaker unit 202 transmits the filter 222(1) to the speaker unit 204. In various embodiments, the control module 220 generates a message that includes the filter 222(1) in the payload. The filter 222(1) included in the message is the filter that the control module 220 designed for the speaker unit 204 (e.g., the filter 222(1) containing the applicable DSP coefficients). Upon generating the message, the hub speaker unit 202 transmits the message to the speaker unit 204.

At step 514, the hub speaker unit 202 transmits an audio signal 256 to the speaker unit 204. In various embodiments, the hub speaker unit 202 receives an input audio signal from an audio source (e.g., the audio source 206). In some embodiments, the output rendering module 226 receives an input audio signal from the audio source 206 via a wire, a wireless stream, or via a network 208. In such instances, the hub speaker unit 202 wirelessly transmits the input audio signal 256 to the speaker unit 204 in a stream using a media channel established between the hub speaker unit 202 and the speaker unit 204.

Alternatively, in some embodiments, the hub speaker unit 202 filters the audio signal 256 using the set of filters 222 that include the filters for the speaker units 204 (e.g., use the filter 222(1) designed for the speaker unit 204(1)) to generate a set of filtered audio signals for the hub speaker unit 202 and the speaker units 204. In such instances, the hub speaker unit 202 transmits the set of filtered audio signals to the respective speaker units 204 in lieu of transmitting the respective filters 222 (e.g., transmitting the filter 222(1) to the speaker unit 204(1)) and subsequently transmitting the audio signal 256. For example, when the hub speaker unit 202 includes more processing resources than a set of speaker units 104, the hub speaker unit 202 filters the audio signal 256 to through the set of filters 222 in parallel. The hub speaker unit 202 then transmits each of the filtered audio signals to the corresponding speaker unit 204 for playback.

At step 516, the hub speaker unit 202 uses the filter 222 to generate a filtered audio signal. In various embodiments, the output rendering module 226 processes the input audio signal by using the one or more filters 222 generated for the hub speaker unit 202 (e.g., the filters 222(3)-222(5)) to generate one or more filtered audio signals. In some embodiments, the one or more filtered audio signals includes directivity information corresponding to the respective directions towards the target listening area 440 relative to the reference position 308 and/or specific positions of the hub speaker unit 202 (e.g., the positions and/or orientations of the respective loudspeakers 210).

At step 518, the hub speaker unit 202 reproduces the filtered audio signal. In various embodiments, the output rendering module 226 reproduces the one or more filtered audio signals by generating an audio output corresponding to the one or more filtered audio signals created by the one or more filters 222. For example, the output rendering module 226 can drive the loudspeakers 210 included in the hub speaker unit 202 to generate a set of soundwaves 402 in the direction(s) toward the target listening area 440. In various embodiments, the set of soundwaves that the loudspeakers 210 generates combine with one or more other soundwaves 404 provided by other speaker units 204 of the modular speaker system 200 to generate a sound field 436 that includes a sweet spot that encompasses the target listening area 440.

Upon generating the set of soundwaves 402, the hub speaker unit 202 returns to step 502 or 504 to optionally detect an additional detachment and/or receive additional positioning information 254. For example, the hub speaker unit 202 returns to step 502 to detect a reattachment to the connection point to the hub speaker unit 202. In such instances, the speaker unit 204 repeats method 500 to acquire filters applicable to the new position of 248 speaker unit 204. Alternatively, the hub speaker unit 202 proceeds to step 504 to receive additional positioning information 254 associated with a move to a new location, or proceeds to step 506 to determine whether the speaker unit 204 stopped moving from additional motion.

Figure 6:
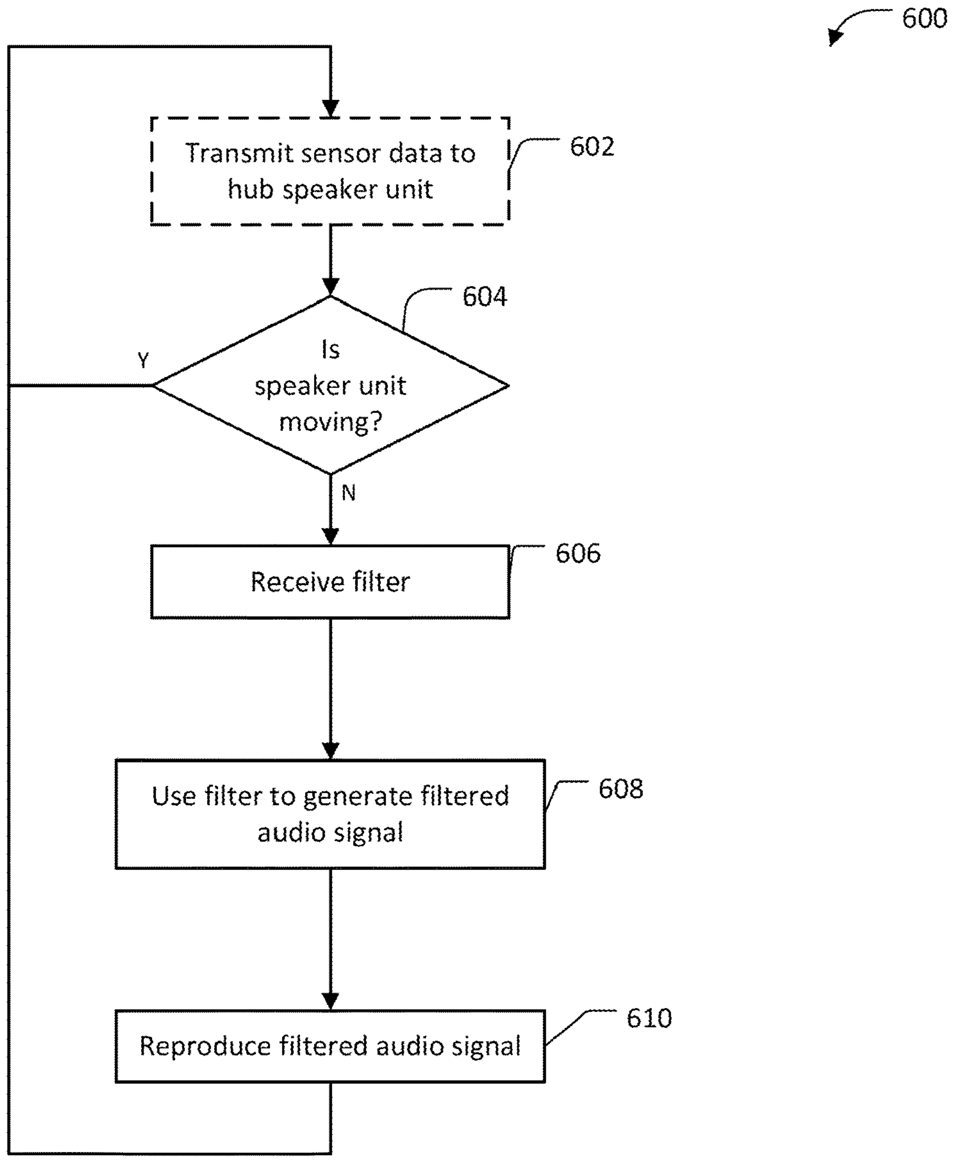
FIG. 6 is a flowchart of method steps for a speaker unit transmitting sensor data to identify a new position associated with generating a filtered audio signal, according to various embodiments of the present disclosure.

FIG. 6 is a flowchart of method steps for a speaker unit transmitting sensor data to identify a new position associated with generating a filtered audio signal, according to various embodiments of the present disclosure. Although the method steps are described with reference to the embodiments of FIGS. 1-4, persons skilled in the art will understand that any system configured to implement the method steps, in any order, falls within the scope of the present disclosure.

As shown, method 600 begins at step 602, where the speaker unit 204 optionally transmits positioning information 254 to the hub speaker unit 102. In various embodiments, the positioning module 260 receives sensor data acquired by one or more motion sensors 252; the positioning module 260 causes the speaker unit 204 to transmit the sensor data in one or more messages to the hub speaker unit 202. In some embodiments, the motion sensors 252 includes multiple types of sensors (e.g., gyroscopes, infrared sensors, microphones, etc.) and a sensor fusion hub that combines the different types of data into a set of positioning information 254. For example, the positioning information 254 is sensor data generated by the IMU (e.g., acceleration measurements, magnetic field measurements, angular rates, etc.).

In some embodiments, the speaker unit 204 detects a detachment of the speaker unit 204 from a connection point. In such instances, the positioning module 260 activates the motion sensors 252 to acquire sensor data associated with the movement of the speaker unit 204. The positioning module 260 produces positioning information 254 from the acquired sensor data and transmits the positioning information 254 in one or more messages to the hub speaker unit 202.

At step 604, the speaker unit 204 determines whether the speaker unit 204 is still moving. In various embodiments, the positioning module 260 determines whether the speaker unit 204 has stopped moving and is stationary. For example, the positioning module 260 determines whether the sensor data indicates that the speaker unit has changed position from a previous time. When the positioning module 260 determines that the speaker unit 204 is still in motion, the speaker unit 204 returns to step 602 to optionally transmit positioning information 254 to the hub speaker unit 202. Otherwise, when the positioning module 260 determines that the speaker unit 204 has stopped moving, the positioning module 260 causes the speaker unit 204 to proceed to step 606.

At step 604, the speaker unit 204 receives a filter 222(1) from the hub speaker unit 202. In various embodiments, the speaker unit 204 communicates with the hub speaker unit 202 and/or coordinates with the hub speaker unit 202 to perform various positioning techniques to determine the current position and/or orientation of the speaker unit 204, such as any of the techniques described above with respect to FIG. 2. When the hub speaker unit 202 determines the current position and/or orientation of the speaker unit 204, the hub speaker unit 202 generates a filter 222(1) for the speaker unit 204 and transmits a message including the filter 222(1) to the speaker unit 204.

In some embodiments, the control module 220 generates the filter 222(1) based on the positioning information 254 that the speaker unit 204 provides. For example, the control module 220 processes the positioning information 254 to determine that the speaker unit 204 is no longer moving. In such instances, the control module 220 of the hub speaker unit 104 uses the positioning information 254 to determine the current position and/or orientation at of the speaker unit 204 (e.g., the arrangement of the speaker units 202, 204 when the speaker unit is at the second location 306) and generates a filter 222(1) based on the current position and/or orientation.

Alternatively, in some embodiments, the control module 220 determines that the speaker unit 204 has stopped moving and, in response, transmits a filter request message to the hub speaker unit 202. In such instances, as discussed above for step 508, the hub speaker unit 202 and/or the speaker unit 204 perform various positioning algorithms to determine the current position of the speaker unit 204. The hub speaker unit 202 generates a filter 222(1) for the speaker unit 204 based on the current position and/or orientation of the speaker unit 204 and transmits a message containing the filter 222(1) to the speaker unit 204.

In some embodiments, the control module 220 determines a direction towards the target listening area 440 relative to the current position and/or orientation the speaker unit 204. In such instances, the control module 220 generates a filter 222(1) operable by the output rendering module 270 to use when generating a filtered audio signal driving the loudspeakers 248 with the filtered audio signal. Driving the loudspeakers 248 with the filtered audio signal produces an audio output that has directivity corresponding to the direction toward the target listening area 440. Upon generating the filters 222(1), the control module 220 transmits the filters 222 to the speaker unit 204, where the speaker unit 204 stores the filter 222(1) in memory 244.

At step 608, the speaker unit 204 uses the filter 222(1) to generate a filtered audio signal. In various embodiments, the output rendering module 270 processes a received audio signal 256 by using the filter 222(1) to generate a filtered audio signal. In some embodiments, the filtered audio signal includes directivity information corresponding to the direction towards the target listening area 440.

At step 610, the speaker unit 204 reproduces the filtered audio signal. In various embodiments, the output rendering module 270 reproduces the filtered audio signal by generating an audio output corresponding to the filtered audio signal. For example, the output rendering module 270 can drive a subset of the loudspeakers 248 to generate a soundwave in the direction of the target area. In various embodiments, the soundwave 404 that the speaker unit 204 generates combines with one or more other soundwaves provided by other units of the modular speaker system 200 to generate a sound field 436. The sound field 436 includes a sweet spot that encompasses the target listening area 440. Upon generating the soundwaves, the speaker unit 204 returns to step 702 to transmit messages including the sensor data to the hub speaker unit 202.

As discussed above and further emphasized here, FIGS. 5 and 6 are merely examples, which should not unduly limit the scope of the claims. Many variations, alternatives, and modifications are possible.

In some embodiments, the hub speaker unit 202 acquires sensor data and/or positioning information 254. The control module 220 determines the current position and/or orientation of the speaker unit 204 and stores determines the current position and/or orientation of the speaker unit 204 as a portion of the position data 224. Alternatively, in some embodiments, the speaker unit 204 acquires sensor data and generates positioning information 254. The positioning module 260 determines the current position and/or orientation of the speaker unit 204 from the positioning information 254 and stores determines the current position and/or orientation of the speaker unit 204 as position data 224.

In some embodiments, the control module 220 uses the portion of the position data 224 for the current position and/or orientation of the speaker unit 204 to generate a filter 222 containing DSP coefficients for the speaker unit 204 (e.g., the filter 222(1) for the speaker unit 204(1)). Alternatively, the positioning module 260 uses the position data 224 for the current position and/or orientation of the speaker unit 204 to generate the filter 222(1) containing the DSP coefficients for the speaker unit 204.

In some embodiments, the output rendering module 226 operating on the hub speaker unit 202 applies the filter 222(1) designed for the speaker unit 204 on a received audio signal 256 to generate a filtered audio signal that the speaker unit 204 is to reproduce. Upon generating the filtered audio signal, the output rendering module 226 causes the hub speaker unit 202 to transmit the filtered audio signal to the speaker unit 204 for reproduction by the speaker unit 204. Alternatively, the output rendering module 270 operating on the speaker unit 204 applies the filter 222(1) on a received audio signal 256 to generate a filtered audio signal. The output rendering module 270 reproduces the filtered audio signal.

Figure 7:
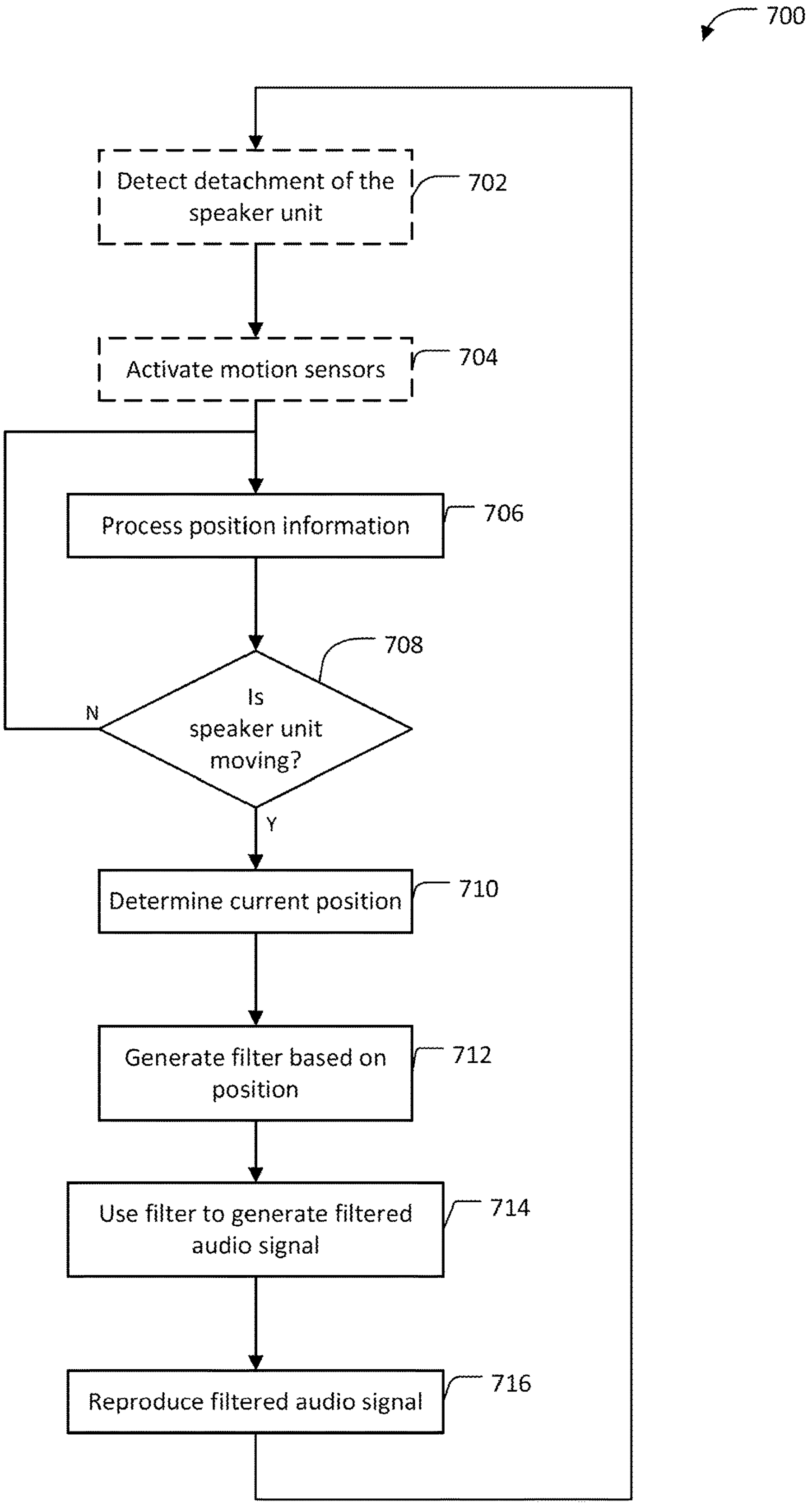
FIG. 7 is a flowchart of method steps for a speaker unit processing positioning information to generate a filter for generating a filtered audio signal, according to various embodiments of the present disclosure.

FIG. 7 is a flowchart of method steps for a speaker unit processing positioning information to generate a filter for generating a filtered audio signal, according to various embodiments of the present disclosure. Although the method steps are described with reference to the embodiments of FIGS. 1-4, persons skilled in the art will understand that any system configured to implement the method steps, in any order, falls within the scope of the present disclosure.

As shown, method 700 begins at step 702, where the speaker unit 204 optionally detects a detachment of the speaker unit 204 has initiated movement. In various embodiments, the positioning module 260 operating in the speaker unit 204 detects a detachment of the speaker unit 204 from a static mount or a connection to another speaker unit (e.g., the hub speaker unit 202), such as a charging port. In some embodiments, the positioning module 260 determines the position of the speaker unit 204 when the detachment is detected. In such instances, the positioning module 260 assigns the determined position as a starting position used to determine a change in relative positions based on the movement.

At step 704, the speaker unit 204 optionally activates the motion sensors 252. In various embodiments, the speaker unit 204 responds to the detection of the detachment of the speaker unit 204 in step 502 by activating one or more motion sensors 252. For example, the positioning module 260 operating in the speaker unit 204 responds to a detection of the speaker unit 204 detaching from the connection point by activating one or more motion sensors 252 to acquire sensor data and generate positioning information 254 from the sensor data. In some embodiments, the motion sensors 252 include multiple types of sensors (e.g., gyroscopes, infrared sensors, microphones, etc.) and a sensor fusion hub that combines the different types of data into a set of positioning information 254.

At step 706, the speaker unit 204 processes the positioning information 254 acquired by the motion sensors 252. In various embodiments, the positioning module 260 periodically generates positioning information 254 corresponding to different positions and/or orientations at different times (e.g., positioning information 254(1) at time $t_1$, positioning information 254(2) at time t2, etc.). In such instances, the positioning module 260 aggregates the positioning information 254 to track the trajectory 304 of the speaker unit 204 relative to the starting position. In some embodiments, the motion data can be sensor data generated by the IMU (e.g., acceleration measurements, magnetic field measurements, angular rates, etc.). In such instances, the speaker unit 204 aggregates the sensor data and determines a trajectory of the speaker unit 204.

Alternatively, in some embodiments, the positioning module 260 performs various positioning algorithms (e.g., triangulation using sensor data) to determine the current position and/or orientation of the now-stationary speaker unit 204. For example, any of the positioning and/or orientation algorithms discussed above with respect to FIG. 2 can be used to determine the current position and orientation at the second location 306 of the speaker unit 204.

At step 708, the speaker unit 204 determines whether the speaker unit 204 is still moving. In various embodiments, the positioning module 260 processes the positioning information 254 to determine the current position and/or orientation relative to the previous position and/or orientation associated with the positioning information 254 to determine whether the speaker unit 204 is stationary or remains in motion. When the positioning module 260 determines that the speaker unit 204 remains in motion, the positioning module 260 returns to step 706 to process additional positioning information 254. Otherwise, the positioning module 260 determines that the speaker unit 204 is not in motion and proceeds to step 510.

At step 710, the speaker unit 204 determines the current position of the speaker unit 204. In various embodiments, the positioning module 260 processes the positioning information 254 to determine the current position and/or orientation of the speaker unit 204. Alternatively, in some embodiments, as discussed in FIG. 2, from the hub speaker unit 202 and/or speaker unit 204 performing various positioning algorithms to determine the current position and/or orientation of the speaker unit 204. The positioning module 260 then stores the generates position data 224(1) or receives the position data 224(1) from the hub speaker unit 202 and stores the position data 224(1).

In some embodiments, the current position and/or corresponds to an absolute position/orientation (e.g., specific coordinates of a location and/or orientation of the speaker unit 204) within an environment. Alternatively, in some embodiments, the current position and/or orientation can correspond to a position relative to a reference point, such as the starting position of the speaker unit 204 determined in step 502, or the position of the hub speaker unit 202. For example, upon storing the starting position and/or orientation at the first location 302(1) as a portion of the position data 224(1), the positioning module 260 can store the current position and/or orientation as a distance and a set of angles relative to the starting position and/or orientation at the first location 302(1).

At step 712, the speaker unit 204 generates a filter 222(1) based on the current position and/or orientation. In various embodiments, the positioning module 260 generates a filter 222(1) to use when reproducing audio signals. In some embodiments, the positioning module 260 determines a direction towards a target listening area 440 relative to the current position and/or orientation of the speaker unit 204. In such instances, the speaker unit 204 generates a filter 222(1) that the output rendering module 270 uses to drive the loudspeakers 248 to produce an audio output that has directivity corresponding to the determined direction towards the target listening area 440.

At step 714, the speaker unit 204 uses the filter 222(1) to generate a filtered audio signal. In various embodiments, the output rendering module 270 processes a received audio signal 256 by using the filter 222(1) to generate a filtered audio signal. In some embodiments, the filtered audio signal includes directivity information corresponding to the direction towards the target listening area 440 relative to the current position and/or orientation At step 716, the speaker unit 204 reproduces the filtered audio signal. In various embodiments, the output rendering module 270 reproduces the filtered audio signal by generating an audio output corresponding to the filtered audio signal. For example, the output rendering module 270 can drive a subset of the loudspeakers 248 to generate a soundwave 404 in the direction of the target listening area 440. In various embodiments, the soundwave 404 that the speaker unit 204 generates combines with one or more other soundwaves 402, 404 provided by other speaker units 202, 204 of the modular speaker system 200 to generate a sound field 436. The sound field 436 includes a sweet spot that encompasses the target listening area 440.

Upon generating the soundwaves 402, 404 the speaker unit 204 returns to step 702-706 to optionally detect a reattachment to the connection point, activate the motion sensors 252, and/or process position information 254. In such instances, the speaker unit 204 repeats method 700 to acquire a filter 222(1) applicable to the new position of the speaker unit 204.

Figure 8:
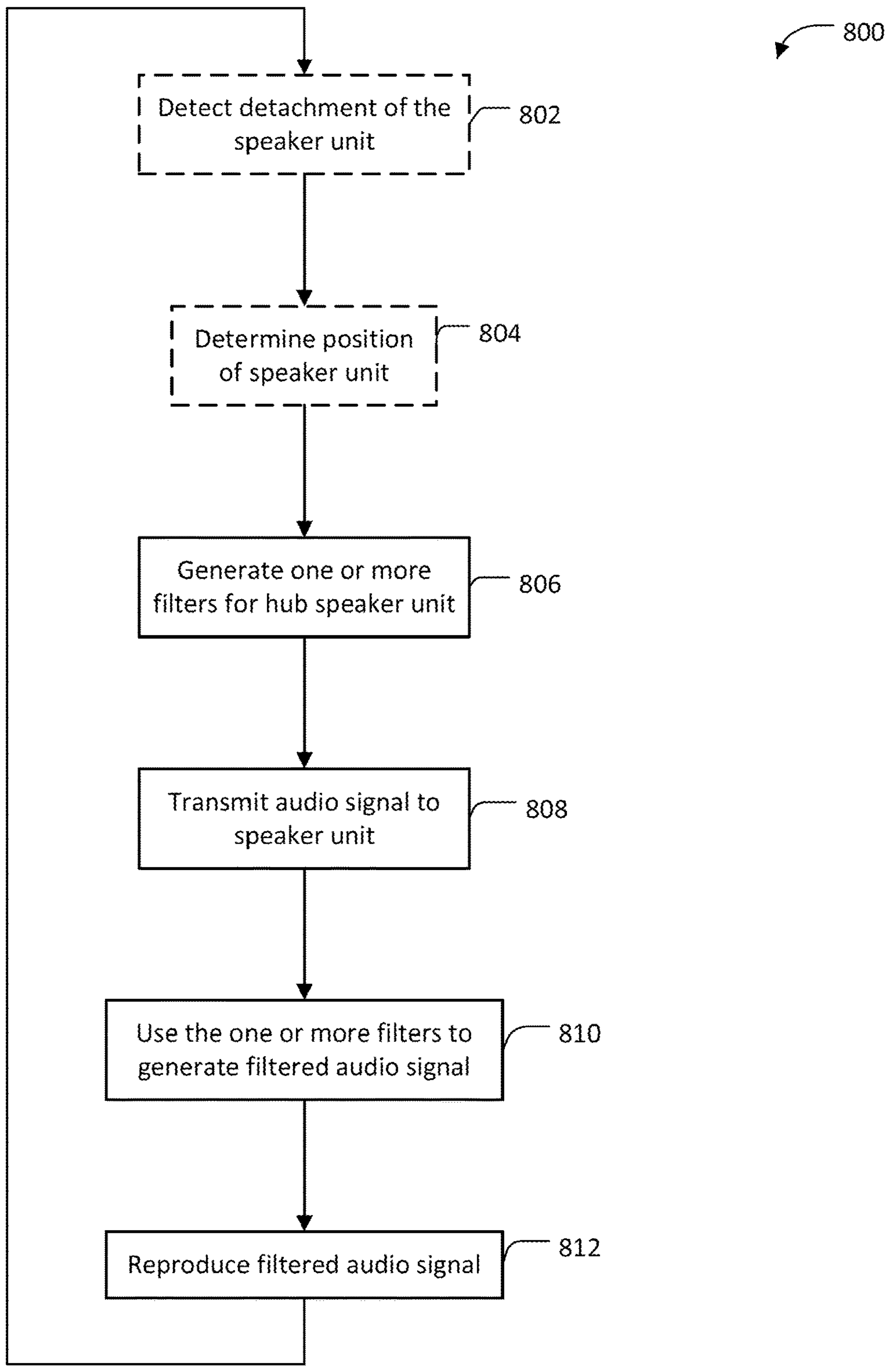
FIG. 8 is a flowchart of method steps for a hub speaker unit generating one or more filters for generating one or more filtered audio signals, according to various embodiments of the present disclosure.

FIG. 8 is a flowchart of method steps for a hub speaker unit generating one or more filters for generating one or more filtered audio signals, according to various embodiments of the present disclosure. Although the method steps are described with reference to the embodiments of FIGS. 1-4, persons skilled in the art will understand that any system configured to implement the method steps, in any order, falls within the scope of the present disclosure.

As shown, method 800 begins at step 802, where the hub speaker unit 202 optionally detects the detachment of the speaker unit 204. In various embodiments, the control module 220 operating in the hub speaker unit 202 optionally detects that the speaker unit 204 is detached from a connection point.

At step 804, the hub speaker unit 202 optionally determines the position of the speaker unit 204. In various embodiments, the control module 220 determines the position of the speaker unit 204 that after the speaker unit 204. For example, upon determining that the speaker unit 204 is moving, the hub speaker unit 202 can receive periodic messages from the speaker unit 204 that include the positioning information 254 corresponding to the movement of the speaker unit 204 through an environment. In such instances, the control module 220 processes the positioning information 254 to track the movement of the speaker unit 204. Alternatively, the hub speaker unit 202 determines that the speaker unit 204 has stopped moving. In such instances, the hub speaker unit 202 performs one or more positioning algorithms to determine the position of the speaker unit 204 and transmit a message to the speaker unit 204 that includes the current position and/or orientation of the speaker unit 204 in the payload.

At step 806, the hub speaker unit 202 generates one or more filters 222 for the hub speaker unit 202. In various embodiments, the control module 220 generates one or more filters 222 for use by the output rendering module 226 when reproducing audio signals. In some embodiments, the control module 220 determines one or more directions towards a target listening area 440 relative to the reference position 308 and/or other positions of the loudspeakers 248 within the hub speaker unit 202. In such instances, the control module 220 generates one or more filters 222 that the output rendering module 226 uses to drive the loudspeakers 248 to produce one or more audio outputs that respectively have directivity corresponding to the determined direction of the target listening area 440.

In some embodiments, the control module 220 generates the one or more filters 222 for the hub speaker unit 202 with DSP coefficients that are also based on the current position and/or orientation of the speaker unit 204. For example, the control module 220 can generate one or more filters 222 that causes the loudspeakers 210 in the hub speaker unit 202 to generate smaller soundwaves 402 when the speaker unit 204 is positioned at a location proximate to the hub speaker unit 202. In another example, the control module 220 can generate the one or more filters 222 for the hub speaker unit 202 that causes the loudspeakers 210 to generate larger soundwaves 402 when the speaker unit 204 is positioned at a more remote location.

At step 808, the hub speaker unit 202 transmits an audio signal to the speaker unit 204. In various embodiments, the hub speaker unit 202 receives an input audio signal from an audio source (e.g., the audio source 206). In some embodiments, the output rendering module 226 receives an input audio signal from the audio source 206 via a wire, a wireless stream, or via a network 208. In some embodiments, the hub speaker unit 202 wirelessly transmits the input audio signal to the speaker unit 204 in a stream using a media channel established between the hub speaker unit 202 and the speaker unit 204.

At step 810, the hub speaker unit 202 uses the one or more filter 222 to generate a filtered audio signal. In various embodiments, the output rendering module 226 processes the input audio signal by using the one or more filters 222 to generate one or more filtered audio signals. In some embodiments, the filtered audio signal can include directivity information corresponding to the direction of the target listening area 440 relative to the reference position and/or positions of the hub speaker unit 202.

At step 812, the hub speaker unit 202 reproduces the filtered audio signal. In various embodiments, the output rendering module 226 reproduces the filtered audio signal by generating an audio output corresponding to the filtered audio signal. For example, the output rendering module 226 can drive the loudspeakers 210 included in the hub speaker unit 202 to generate a set of soundwaves 402 in the direction toward the target listening area 440. In various embodiments, the set of soundwaves 402 that the loudspeakers 210 generate combine with one or more other soundwaves 404 provided by the speaker units 204 of the modular speaker system 200 to generate a sound field 436. The sound field 436 includes a sweet spot that encompasses the target listening area 440. Upon generating the set of soundwaves 402, the hub speaker unit 202 returns to steps 802-806 to optionally detect a detachment of the speaker unit 204 reattachment to the connection point, detachment from a separate connection point, determine a new position based on movement from the current position, or generate a new set of filters 222 for the hub speaker unit 202.

In sum, a modular speaker system determines a position for a speaker unit upon determining that the motion of one or more speaker units has stopped. In various embodiments, a positioning module operating on the speaker unit uses various sensor information and/or signals to determine the position of the speaker unit. The positioning module generates a filter of the speaker unit based on the position of the speaker unit when the speaker unit stops moving. In some embodiments, the filter includes digital signal processing components that provide directionality to an audio signal such that the speaker unit reproduces soundwaves that travel in the direction towards a target sound area.

Alternatively, in some embodiments, a control module operating on the hub speaker unit processes the positioning information and uses the positioning information to generate a set of filters. The set of filters includes a filter to be used by the speaker unit to generate the filtered audio signal. In some embodiments, the set of filters includes a respective filter for use by each of the hub speaker unit and each of the speaker units. The speaker units use their respective filters to generate filtered audio signals and reproduce the audio signals by generating soundwaves corresponding to the filtered audio signals. The soundwaves combine within the listening environment to generate a sound field that covers a target listening area.

At least one technical advantage of the disclosed techniques relative to the prior art is that, with the disclosed techniques, the modular speaker system calibrates the speaker units in the system to generate an optimized sound field without a user having to perform iterative positioning and calibrating processes. In particular, the disclosed techniques automatically calibrate the modular speaker system whenever a speaker is moved. Further, the disclosed techniques reduce the number of times that the positions of the speaker units are determined, which provide an optimized sound field while using less processing resources and consuming less power than conventional calibration approaches. These technical advantages provide one or more technological improvements over prior art approaches.

1. In various embodiments, a computer-implemented method detecting that a speaker unit has moved to a first location, determining, based on positioning information associated with the speaker unit, a position and an orientation of the speaker unit relative to a target listening area, filtering, using a filter that is determined using at least the position and the orientation, an input audio signal to generate a filtered audio signal, and outputting the filtered audio signal using one or more loudspeakers.

2. The computer-implemented method of clause 1, where the step of detecting that the speaker unit has moved to the first location comprises detecting that the speaker unit is stationary.

3. The computer-implemented method of clause 1 or 2, where the step of detecting that the speaker unit is stationary comprises determining, from the positioning information, that the speaker unit has not changed position from a previous location.

4. The computer-implemented method of any of clauses 1-3, where an inertial measurement unit included in the speaker unit generates a first subset of positioning information including at least one of acceleration measurements or magnetic field measurements, and the step of determining the position of the speaker unit comprises processing the first subset of positioning information to determine a change in position of the speaker unit from a previous location.

5. The computer-implemented method of any of clauses 1-4, where the inertial measurement unit generates a second subset of positioning information including at least one of magnetic field measurements or angular rates of change, and the step of determining the orientation of the speaker unit comprises processing the second subset of positioning information to determine a change in orientation from a previous orientation.

6. The computer-implemented method of any of clauses 1-5, where the step of determining the position of the speaker unit comprises using triangulation based on one or more signals emitted by the speaker unit or a hub unit.

7. The computer-implemented method of any of clauses 1-6, where the position and orientation of the speaker unit at the first location comprises a distance and a set of angles relative to one of a previous location of the speaker unit, or a reference location.

8. The computer-implemented method of any of clauses 1-7, further comprising transmitting the positioning information to a hub unit, where the positioning information is usable by the hub unit to determine the position and the orientation of the speaker unit.

9. The computer-implemented method of any of clauses 1-8, further comprising the speaker unit receiving the filter from the hub unit.

10. The computer-implemented method of any of clauses 1-9, further comprising generating, by the speaker unit, the filter based on the position and the orientation.

11. In various embodiments, a speaker unit comprises one or more loudspeakers, a memory storing instructions, and a processor coupled to the memory that executes the instructions to perform steps comprising detecting that the speaker unit has moved to a first location, determining, based on positioning information associated with the speaker unit, a position and an orientation of the speaker unit relative to a target listening area, filtering, using a filter that is determined using at least the position and the orientation, an input audio signal to generate a filtered audio signal, and outputting the filtered audio signal using the one or more loudspeakers.

12. The speaker unit of clause 11, where the speaker unit is detachable from a connection point of a hub unit, and the steps further comprise detecting that the speaker unit has become detached from the hub unit.

13. The speaker unit of clause 11 or 12, where the connection point is a charging port.

14. The speaker unit of any of clauses 11-13, further comprising one or more sensors that include at least one of an accelerometer, a gyroscopic sensor, an inertial management unit, or a magnetometer, where the position and the orientation of the speaker unit are determined from data collected using the one or more sensors.

15. The speaker unit of any of clauses 11-14, where the steps further comprise, in response to detecting that the speaker unit has become detached, activating the one or more sensors.

16. The speaker unit of any of clauses 11-15, where the step of detecting that the speaker unit has moved to the first location comprises detecting that the speaker unit is stationary.

17. The speaker unit of any of clauses 11-16, where the steps further comprise transmitting the positioning information to a hub unit, where the positioning information is usable by the hub unit to determine the position and the orientation of the speaker unit.

18. The speaker unit of any of clauses 11-17, where the steps further comprise receiving the filter from a hub unit, or generating the filter based on the position and the orientation.

19. One or more non-transitory computer-readable media storing instructions that, when executed by one or more processors associated with a hub unit of a speaker system, cause the one or more processors to perform the steps of receiving an indication that a speaker unit has become stationary, and determining, based on positioning information associated with the speaker unit and in response to receiving the indication, a position and an orientation of the speaker unit relative to a target listening area, generating, based on the position and the orientation, a filter useable to filter an input audio signal to generate a filtered audio signal, wherein when the filtered audio signal is output by one or more loudspeakers in the speaker unit, the filtered audio signals generate a sweet spot in a sound field in the target listening area.

20. The one or more non-transitory computer-readable media of claim 19, the steps further comprising transmitting the filter to the speaker unit.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method comprising:

detecting that a speaker unit has moved to a first location;

determining, based on positioning information associated with the speaker unit, a position and an orientation of the speaker unit relative to a target listening area;

receiving, by the speaker unit from a hub unit, a message including a filter, wherein;

the filter is generated based on at least the position and the orientation, and the filter includes a plurality of digital signal processor (DSP) coefficients that were generated by the hub unit based on the positioning information;

receiving, by the speaker unit, an input audio signal;

filtering, by the speaker unit using the filter, the input audio signal to generate a filtered audio signal, wherein the filter with the plurality of DSP coefficients steers the filtered audio signal to the target listening area; and outputting, by the speaker unit, the filtered audio signal using one or more loudspeakers to generate at least a portion of a sound field that includes a sweet spot in the target listening area.

2. The computer-implemented method of claim 1, wherein the step of detecting that the speaker unit has moved to the first location comprises detecting that the speaker unit is stationary.

3. The computer-implemented method of claim 2, wherein the step of detecting that the speaker unit is stationary comprises determining, from the positioning information, that the speaker unit has not changed position from a previous location.

4. The computer-implemented method of claim 1, wherein:

an inertial measurement unit included in the speaker unit generates a first subset of positioning information including at least one of acceleration measurements or magnetic field measurements; and the step of determining the position of the speaker unit comprises processing the first subset of positioning information to determine a change in position of the speaker unit from a previous location.

5. The computer-implemented method of claim 4, wherein:

the inertial measurement unit generates a second subset of positioning information including at least one of magnetic field measurements or angular rates of change; and the step of determining the orientation of the speaker unit comprises processing the second subset of positioning information to determine a change in orientation from a previous orientation.

6. The computer-implemented method of claim 1, wherein the step of determining the position of the speaker unit comprises using triangulation based on one or more signals emitted by the speaker unit or a hub unit.

7. The computer-implemented method of claim 1, wherein the position and orientation of the speaker unit at the first location comprises a distance and a set of angles relative to one of a previous location of the speaker unit, or a reference location.

8. The computer-implemented method of claim 1, further comprising:

transmitting, by the speaker unit, the positioning information to the hub unit, wherein the positioning information is usable by the hub unit to determine the position and the orientation of the speaker unit.

9. The computer-implemented method of claim 1, further comprising generating, by the speaker unit, a second filter based on the position and the orientation.

10. A speaker unit comprising:

one or more loudspeakers;

a memory storing instructions; and a processor coupled to the memory that executes the instructions to perform steps comprising:

detecting that the speaker unit has moved to a first location;

determining, based on positioning information associated with the speaker unit, a position and an orientation of the speaker unit relative to a target listening area;

receiving, from a hub unit, a filter, wherein:

the filter is generated based on at least the position and the orientation, and the filter includes a plurality of digital signal processor (DSP) coefficients that were generated by the hub unit based on the positioning information;

receiving an input audio signal;

filtering, using the filter, the input audio signal to generate a filtered audio signal, wherein the filter with the plurality of DSP coefficients steers the filtered audio signal to the target listening area; and outputting the filtered audio signal using the one or more loudspeakers to generate at least a portion of a sound field that includes a sweet spot in the target listening area.

11. The speaker unit of claim 10, wherein:

the speaker unit is detachable from a connection point of a hub unit; and the steps further comprise detecting that the speaker unit has become detached from the hub unit.

12. The speaker unit of claim 11, wherein the connection point is a charging port.

13. The speaker unit of claim 11, further comprising:

one or more sensors that include at least one of an accelerometer, a gyroscopic sensor, an inertial management unit, or a magnetometer;

wherein the position and the orientation of the speaker unit are determined from data collected using the one or more sensors.

14. The speaker unit of claim 13, wherein the steps further comprise, in response to detecting that the speaker unit has become detached, activating the one or more sensors.

15. The speaker unit of claim 11, wherein the step of detecting that the speaker unit has moved to the first location comprises detecting that the speaker unit is stationary.

16. The speaker unit of claim 10, wherein the steps further comprise:

transmitting the positioning information to the hub unit, wherein the positioning information is usable by the hub unit to determine the position and the orientation of the speaker unit.

17. The speaker unit of claim 10, wherein the steps further comprise generating a second filter based on the position and the orientation.

18. One or more non-transitory computer-readable media storing instructions that, when executed by one or more processors associated with a hub unit of a speaker system, cause the one or more processors to perform the steps of:

receiving an indication that a speaker unit has become stationary;

determining, based on positioning information associated with the speaker unit and in response to receiving the indication, a position and an orientation of the speaker unit relative to a target listening area;

generating, based on the position and the orientation of the speaker unit relative to the target listening area, a plurality of digital signal processor (DSP) coefficients;

generating, based on the DSP coefficients, a filter useable by the speaker unit to filter an input audio signal to generate one or more filtered audio signals, wherein the filter with the DSP coefficients steers an audio signal to the target listening area;

transmitting a message including the filter to the speaker unit; and upon transmitting the filter to the speaker unit:

receiving the input audio signal, and transmitting the input audio signal to the speaker unit.

19. The computer-implemented method of claim 1, wherein:

the speaker unit includes a second filter that comprises one of an equalization filter or a spatialization filter, and generating the filtered audio signal comprises:

filtering, using the filter, the input audio signal to add directivity information, and filtering, by the speaker unit using the second filter, to modify the input audio signal to generate the filtered audio signal.

* * * * *